United States Patent
Kumar

(10) Patent No.: US 8,433,008 B2
(45) Date of Patent: Apr. 30, 2013

(54) RECEIVER FOR DETECTING SIGNALS IN THE PRESENCE OF HIGH POWER INTERFERENCE

(75) Inventor: Rajendra Kumar, Cerritos, CA (US)

(73) Assignee: The Aerospace Corporation, El Segundo, CA (US)

( * ) Notice: Subject to any disclaimer, the term of this patent is extended or adjusted under 35 U.S.C. 154(b) by 901 days.

(21) Appl. No.: 12/537,516

(22) Filed: Aug. 7, 2009

(65) Prior Publication Data
US 2011/0033014 A1    Feb. 10, 2011

(51) Int. Cl.
*H03D 1/00* (2006.01)

(52) U.S. Cl.
USPC .......................................... 375/343; 375/346

(58) Field of Classification Search .................. 375/316, 375/340, 343, 346, 347, 349, 350; 455/130, 455/296
See application file for complete search history.

(56) References Cited

U.S. PATENT DOCUMENTS

| | | | |
|---|---|---|---|
| 4,959,656 A | 9/1990 | Kumar | |
| 5,019,824 A | 5/1991 | Kumar | |
| 5,165,051 A | 11/1992 | Kumar | |
| 5,918,161 A | 6/1999 | Kumar et al. | |
| 6,176,451 B1 | 1/2001 | Drymon | |
| 6,529,560 B1 * | 3/2003 | Creighton | 375/284 |
| 6,693,979 B1 | 2/2004 | Kumar | |
| 6,956,893 B2 * | 10/2005 | Frank et al. | 375/147 |
| 2005/0141594 A1 * | 6/2005 | Smith et al. | 375/130 |
| 2006/0064725 A1 * | 3/2006 | Rabinowitz et al. | 725/68 |

OTHER PUBLICATIONS

Kumar, R., "Analysis of FM Demodulator Output Noise with Applications to the Space Lift Range System," Aerospace Conference, 2006 IEEE, pp. 1-9.
Kumar et al., "Performance Analysis of a Command Destruct Subsystem of the Spacelift Range System," Aerospace Conference, 2003 Proceedings, 2003 IEEE, vol. 3, pp. 3-1381 to 3-1388, Mar. 8-15, 2003.
Kumar, R., "Performance of an Incoherent Receiver for the Command Destruct Signals of the Space Lift Range System," $22^{nd}$ AIAA International Communications Satellite Systems Conference & Exhibit 2004, May 9-12, 2004, No. AIAA 2004-3107, pp. 1-8.
U.S. Appl. No. 12/536,078, filed Aug. 5, 2009.

* cited by examiner

*Primary Examiner* — David C. Payne
*Assistant Examiner* — Vineeta Panwalkar
(74) *Attorney, Agent, or Firm* — K & L Gates LLP

(57) ABSTRACT

A RF receiver that comprises: (i) a complex mixer for converting a version of the RF signal to a complex baseband signal comprising an in-phase component and a quadrature component; (ii) one or more analog-to-digital converters (ADCs) connected to the complex mixer for digitizing the in-phase component and the quadrature component of the complex baseband signal; and (iii) a digital signal processor (DSP) connected the one or more ADCs. The DSP is programmed to mitigate interference in the complex baseband signal by a process that comprises the steps of: (i) performing at least one cross correlation operation involving L-length segments of the digitized in-phase and quadrature components of the complex baseband signal; and (ii) concatenating the cross-correlated L-length segments of the digitized in-phase and quadrature components of the complex baseband signal to produce digitized interference mitigated in-phase and quadrature components of the complex baseband signal.

21 Claims, 22 Drawing Sheets

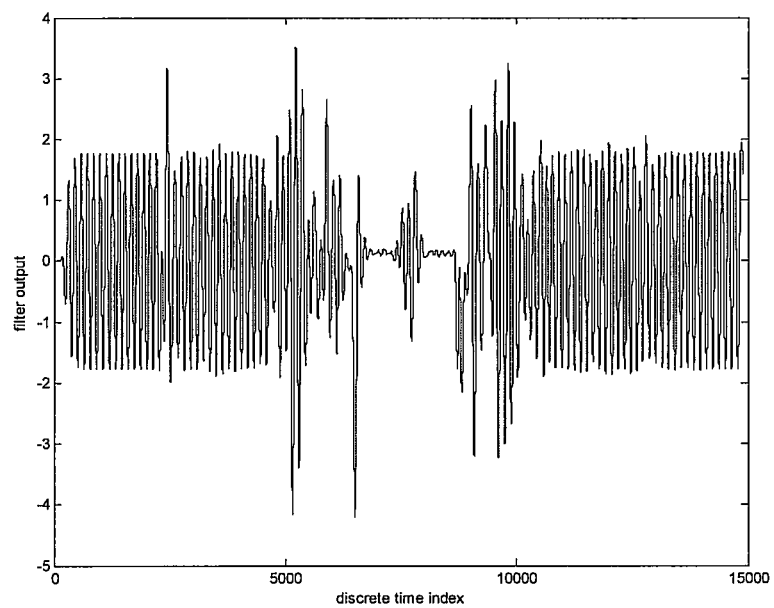
Fig. 16
Fig. 17
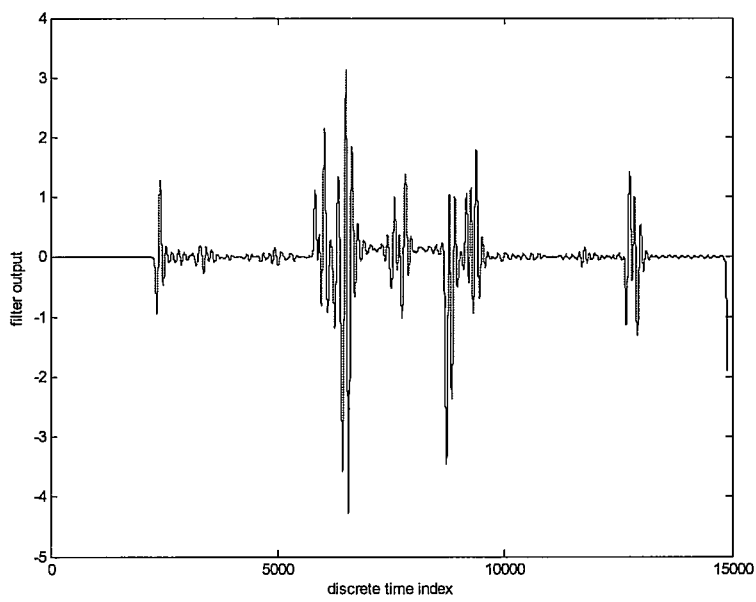

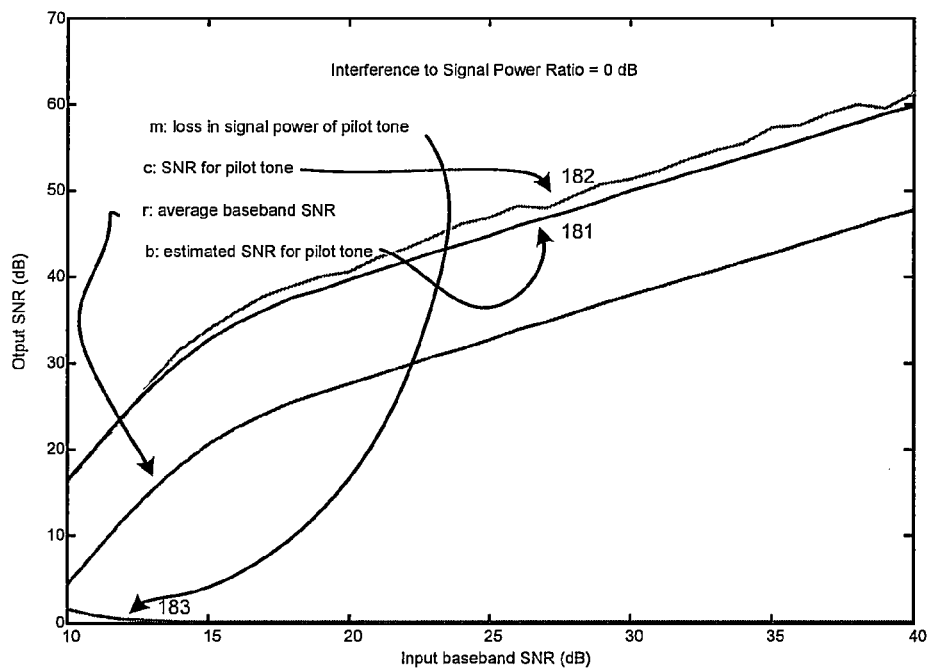
Fig. 18
Fig. 19
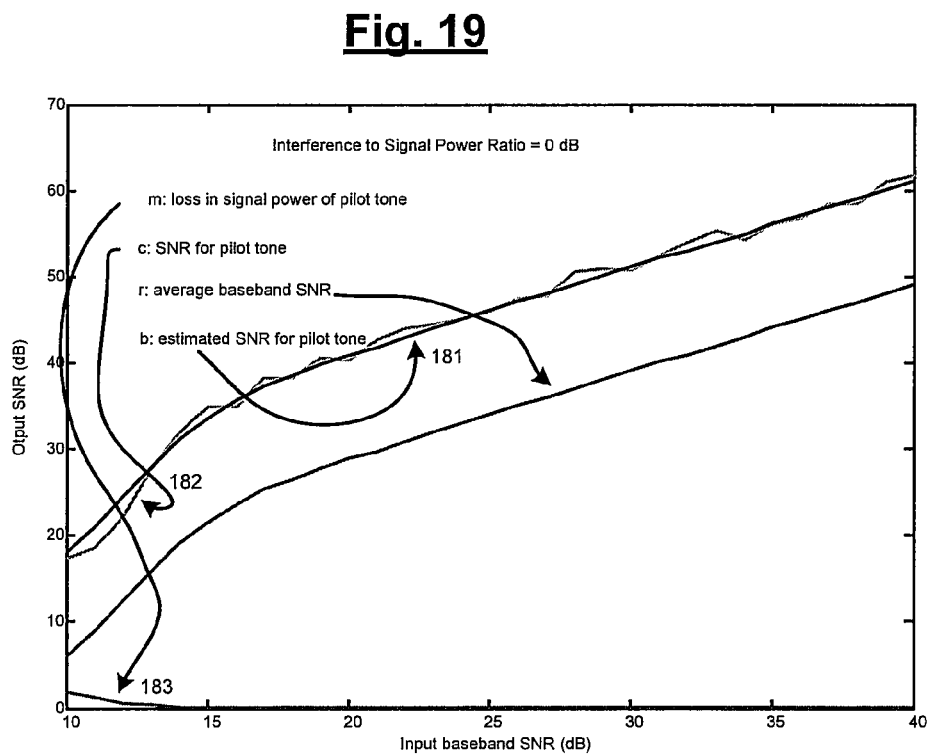

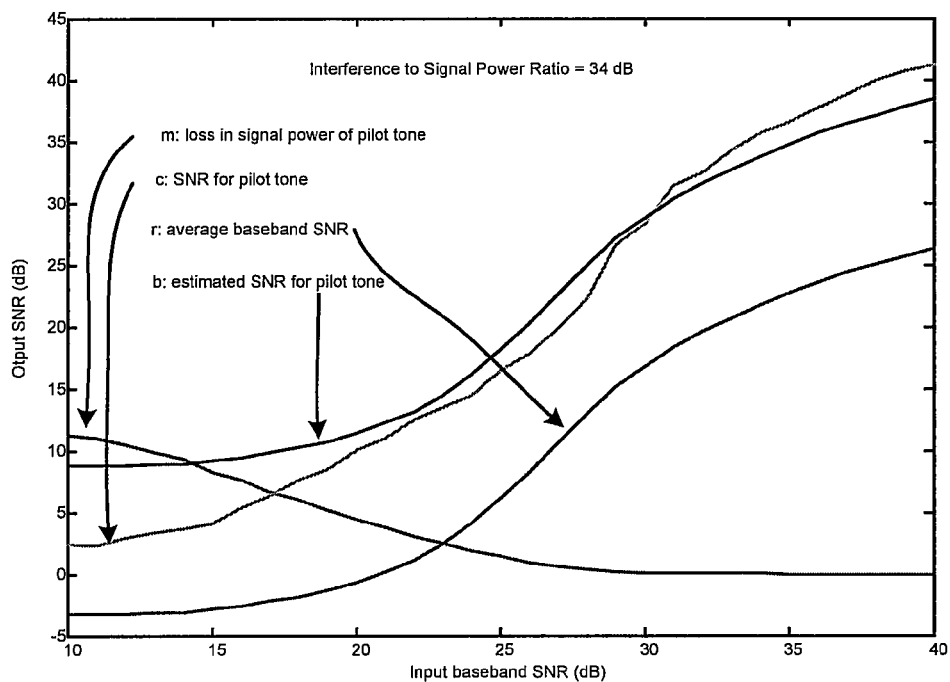
Fig. 20
Fig. 21
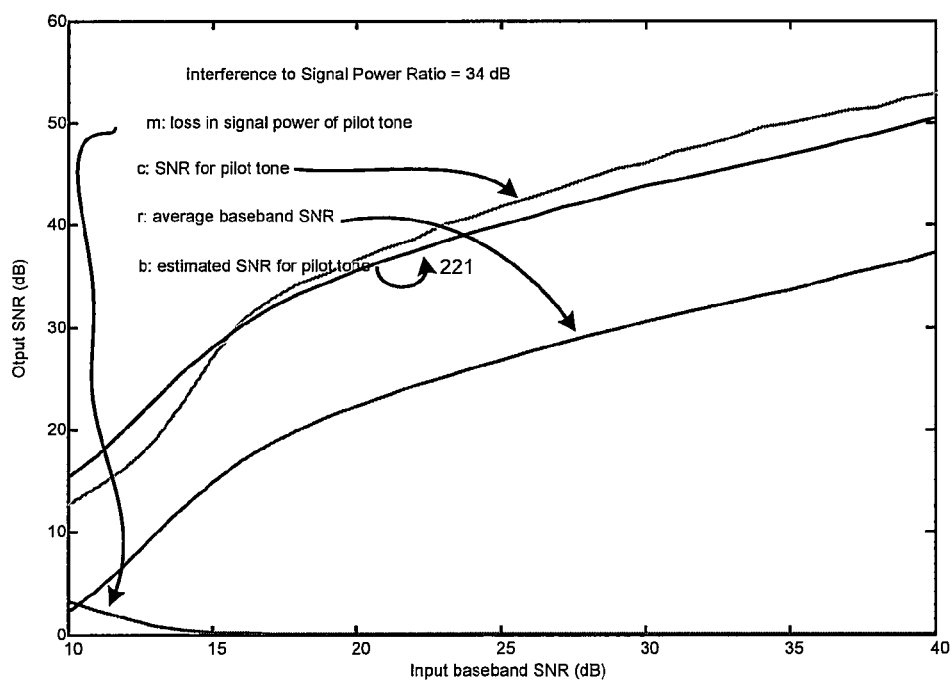

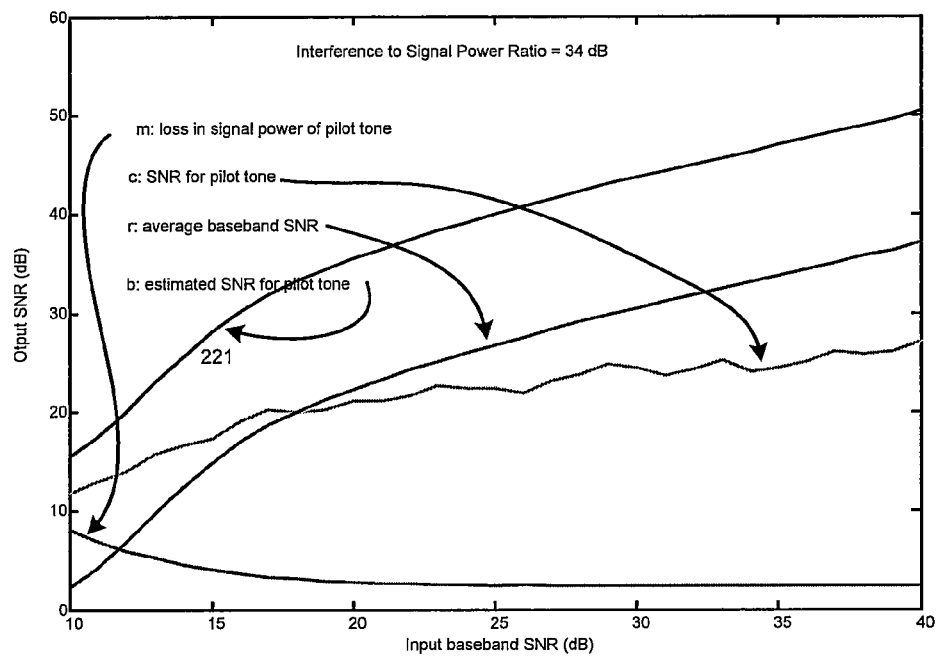
Fig. 22
Fig. 23
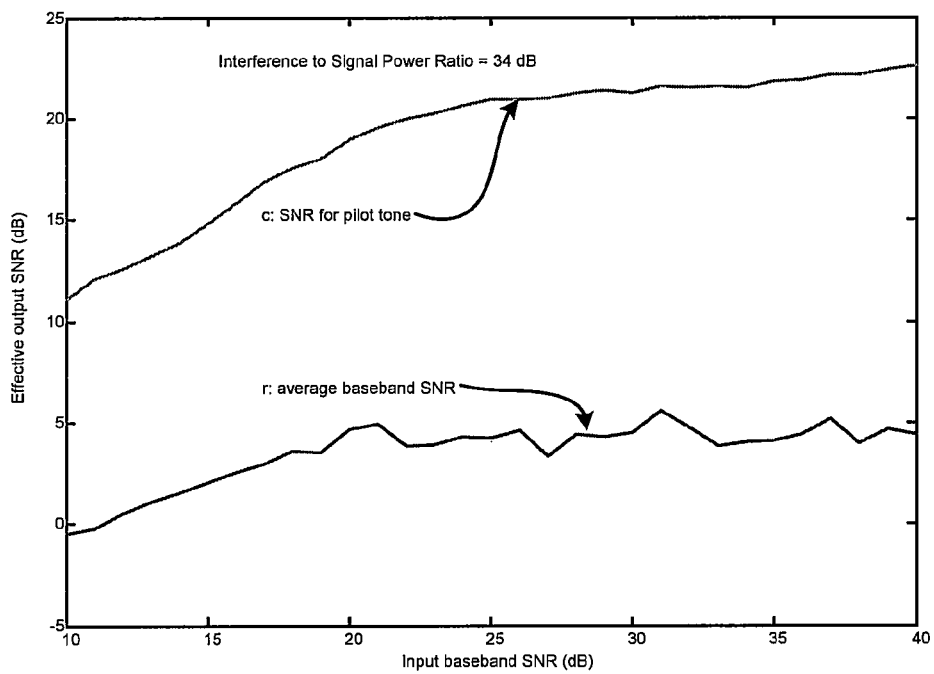

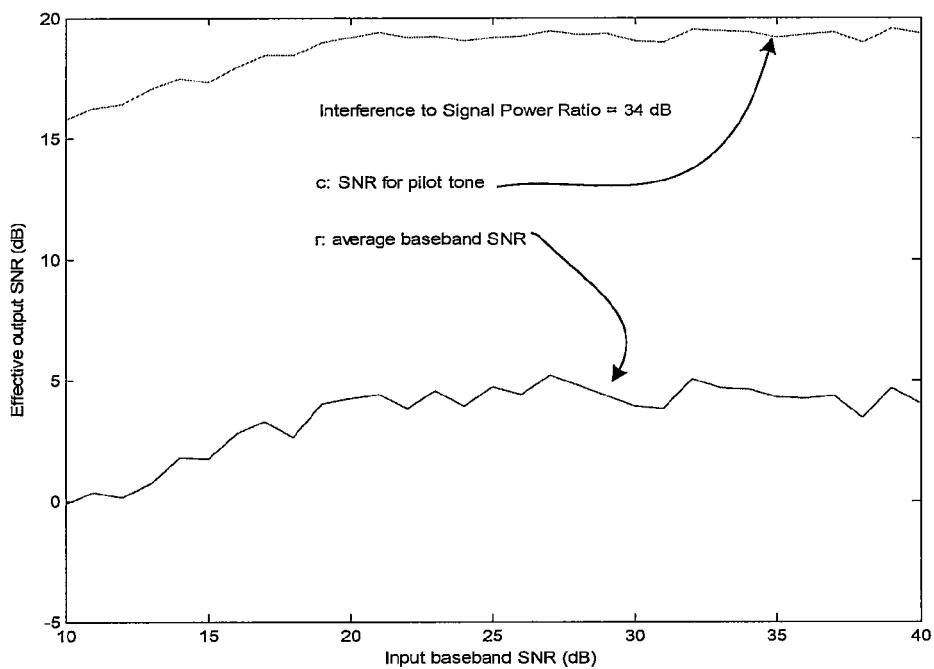
Fig. 24
Fig. 25
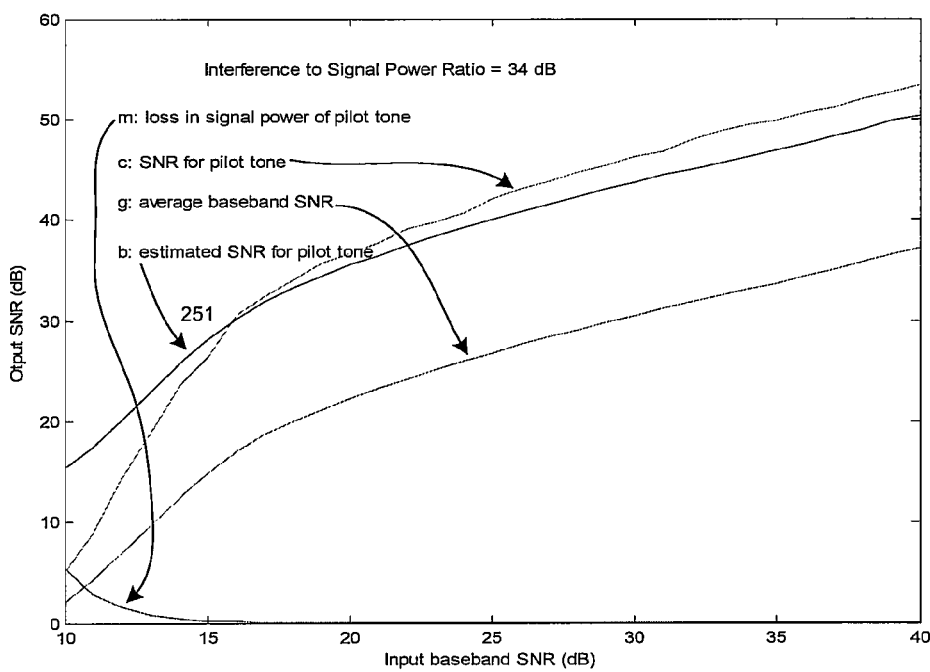

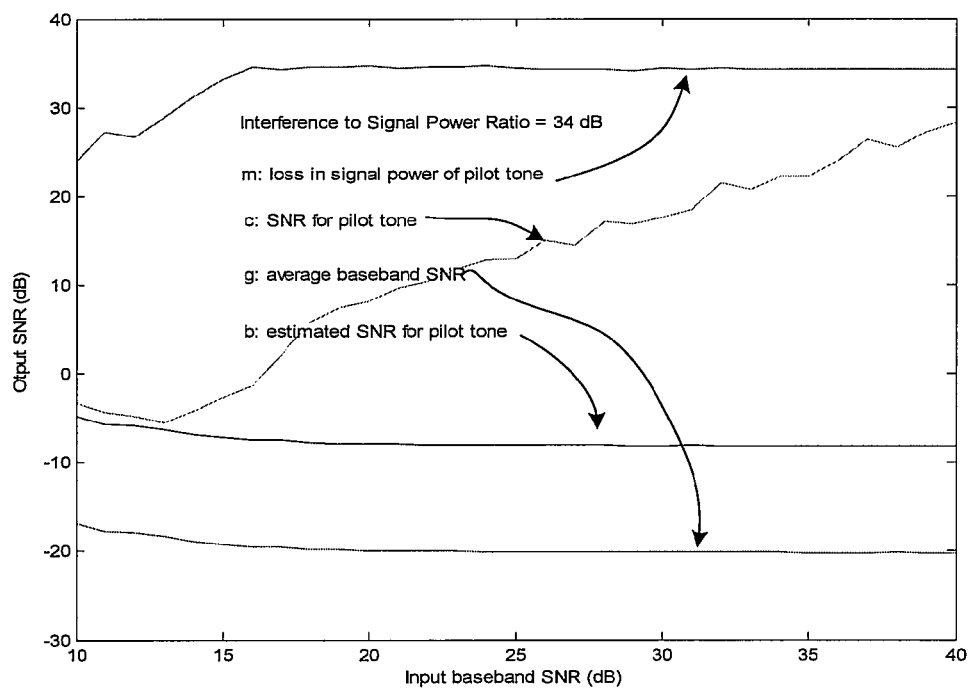
Fig. 26
Fig. 27
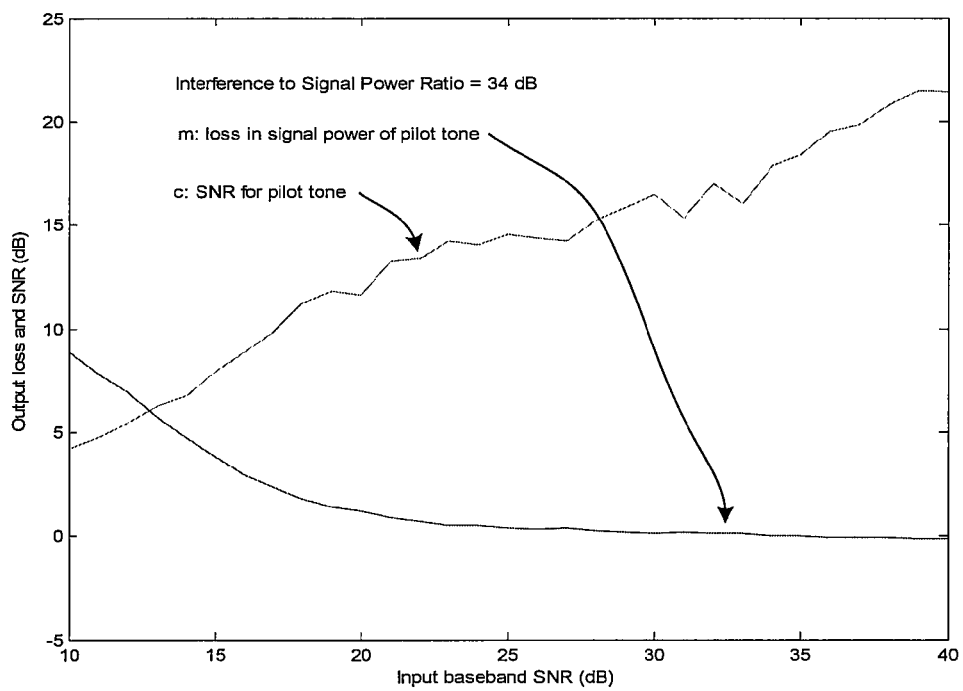

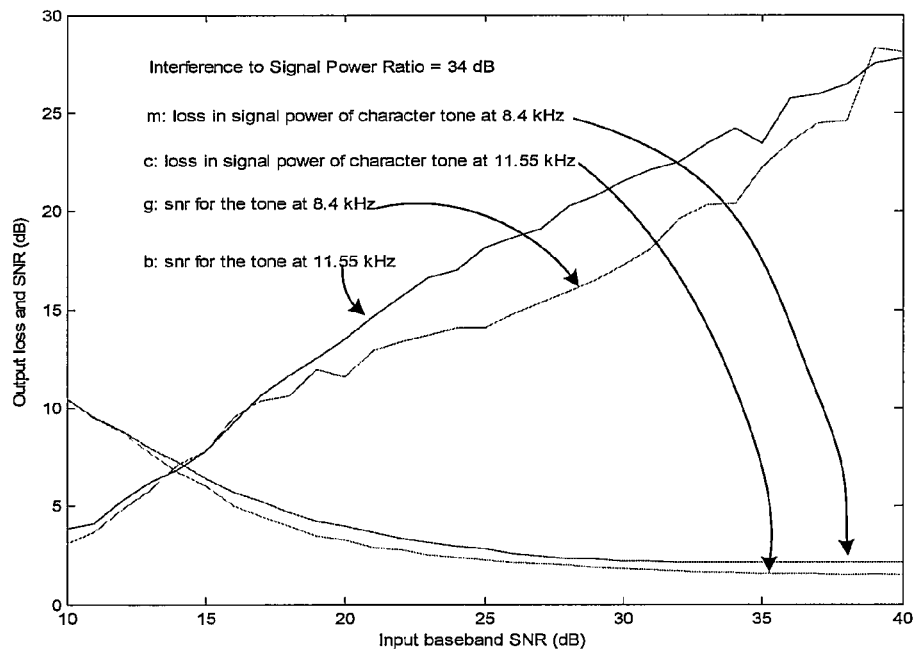
Fig. 28
Fig. 29
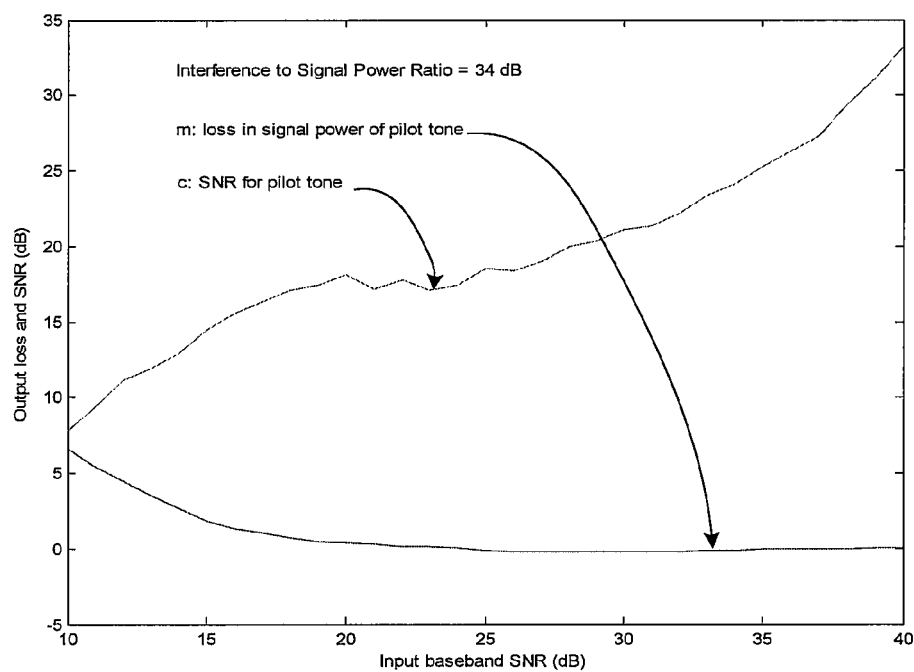

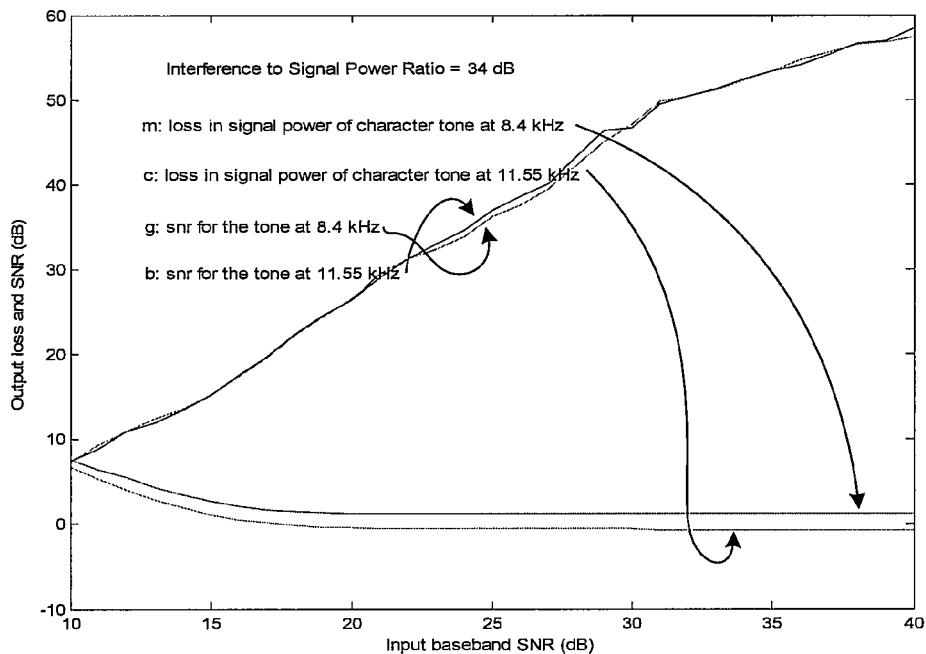
Fig. 30
Fig. 31
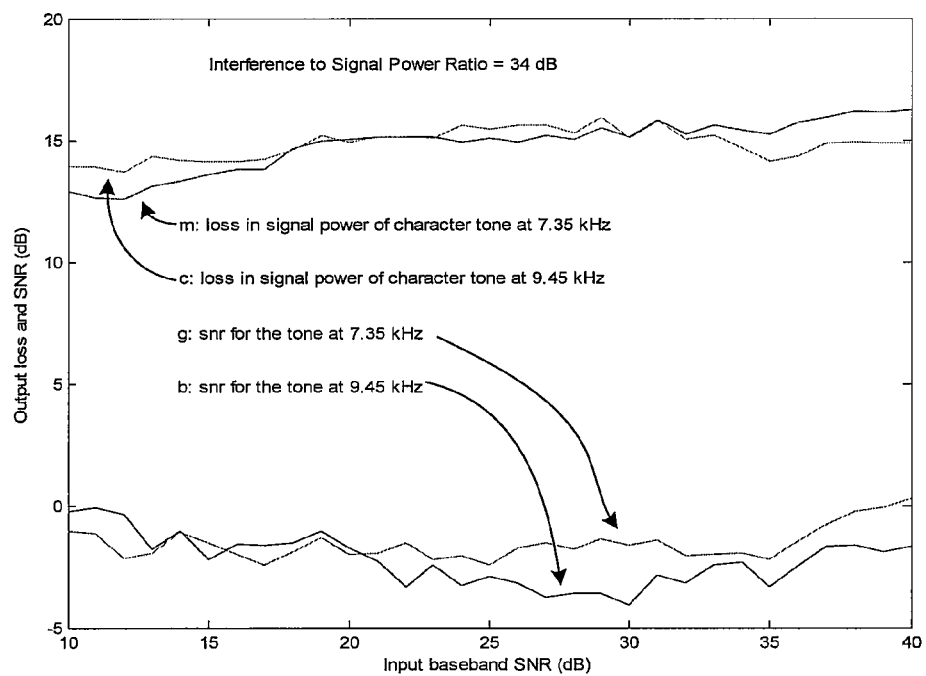

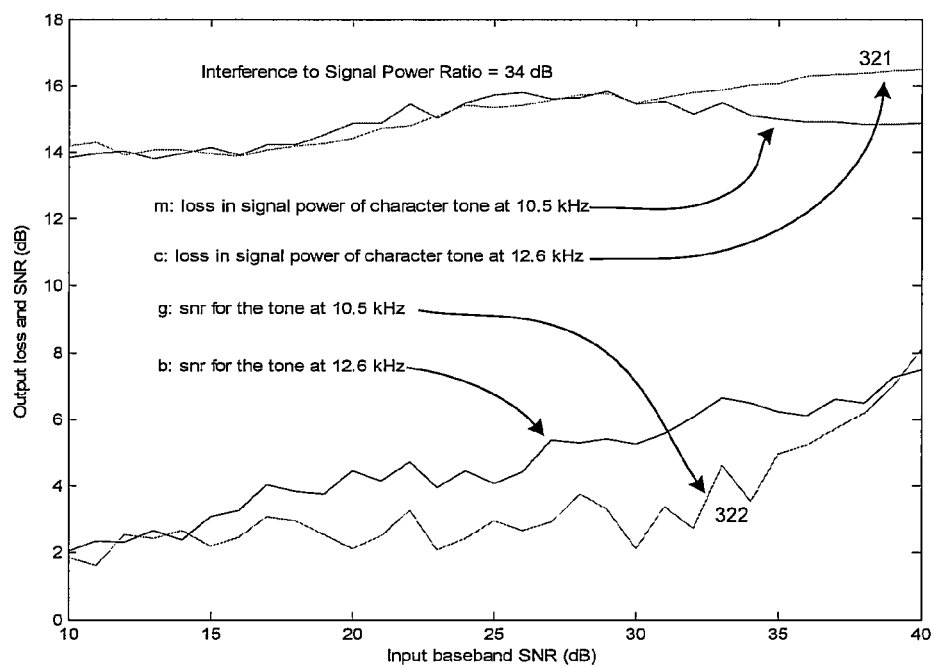
Fig. 32
Fig. 33
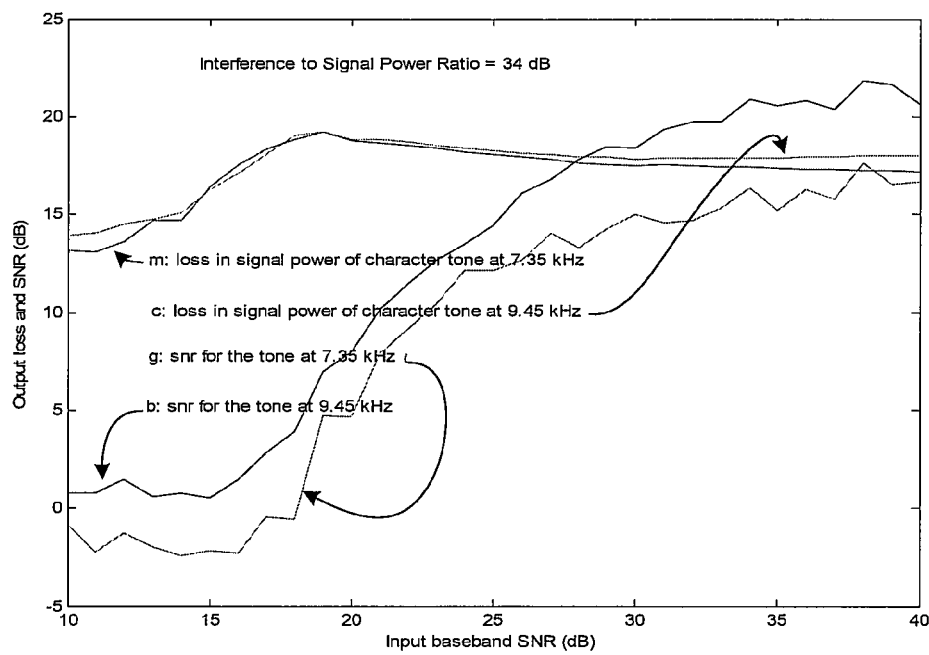

US 8,433,008 B2

RECEIVER FOR DETECTING SIGNALS IN THE PRESENCE OF HIGH POWER INTERFERENCE

STATEMENT REGARDING FEDERALLY FUNDED RESEARCH

The invention was made with Government support under contract No. FA8802-04-C-0001 by the Department of the Air Force. The Government has certain rights in the invention.

BACKGROUND

Command and Telemetry subsystems constitute two of the most important subsystems of the U.S. Air Force Space Lift Range System (SLRS) designed to provide operational support for the space launch vehicles. A command destruct signal (CDS) is sent to the launch vehicle (LV) if the trajectory of the LV poses any serious safety concerns. While the need to issue a CDS command is by necessity very infrequent, safety considerations require that this link have very high reliability under all conditions. It is also required to ensure that the command uplink can be closed with sufficient margin under the worst possible conditions and from any intended site(s). Under normal operating conditions when the only significant disturbance is the receiver thermal noise, there is no real concern in terms of providing such a margin as shown in some of the previous analyses. However, in the presence of the high power pulse interference, the performance can be very poor. As is intuitively obvious, when most of the period of the CDS pulse is interfered by the high power pulse, no detection takes place by the conventional FM receivers with analog or digital implementation.

The CDS command signal is comprised of a known sequence of pairs of pulsed tones in the received signal. The pairs of frequencies are selected from a predetermined set of seven tones. The CDS signal is sent to the launch vehicle, should the range safety considerations necessitate the vehicle's destruction. There is also a pilot tone that is transmitted independently and in addition to the sequence of pairs of pulsed tones. The traditional command receiver is comprised of an FM receiver for the demodulation of the pulsed tones and a command decoder that ascertains as to which tone pairs if any are present in the received signal during any pulse period and uses this information to finally determine whether or not a command signal is present in the received bandpass signal.

In the presence of high power pulse interference, the performance of the traditional command receiver is very poor in that there is virtually no detection possible with such a receiver. This is intuitively obvious and is also borne out by simulations. The performance can be partially improved by blanking; however, such an approach will work only under certain conditions and that too with a relatively large performance loss.

SUMMARY

In one general aspect, the present invention is directed to a RF receiver for CDS signals, although it could be used to receive different types of signals as well. According to various embodiments, the RF receiver is comprised of an RF section, a down converter to IF, a down converter to complex baseband, a pair of analog-to-digital converters (ADC), and a digital signal processor (DSP). The DSP processes the complex baseband signal available at the output of the down converter to complex baseband so as to optimally estimate the amplitudes of various character tones and the pilot tone that are present in the CDS signal, along with the estimates of the associated signal-to-noise power ratios (SNRs) for the various tones. The DSP, in various embodiments, may be comprised of three distinct stages: (i) an interference rejection stage; (ii) a demodulator stage; and (iii) a tones' amplitudes and SNRs estimator stage. The rejection stage may mitigate interference from the complex baseband signal using correlation techniques. The demodulator digitally demodulates the output of the interference mitigation stage. Different types of demodulators may be used depending on the modulation used. For example, a digital FM demodulator may be used. The last stage of the DSP is an optimum estimator of the tone amplitudes, which again reduces the impact of the interference on the detection performance. The estimates of the tone amplitudes and their associated SNRs may be input to a command decoder, which determines whether or not the CDS signal is present.

Comprehensive simulation results show that excellent detection is possible, even under a relatively high interference power level and over a wide range of signal-to-receiver noise power ratios likely to be encountered over the CDS link, with an embodiment of the receiver according to the present invention, whereas no meaningful CDS signal detection is possible with the standard FM demodulator in the presence of such interference. For example, with an interference to signal power ratio of 34 dB, and an input baseband SNR of 40 dB, there is no attenuation of the tone amplitudes due to interference and the tones' SNRs exceed 50 dB with a receiver according to embodiments of the present invention. In contrast, with a standard FM receiver a tone amplitude attenuation of more than 35 dB is incurred, thus essentially losing the CDS signal completely.

These and other advantages will be apparent from the description below.

FIGURES

Various embodiments of the present invention are described herein by way of example in conjunction with the following figures, wherein:

FIGS. 11-34 are charts illustrating simulation results for simulations involving various embodiments of the present invention.

DESCRIPTION

Figure 1:
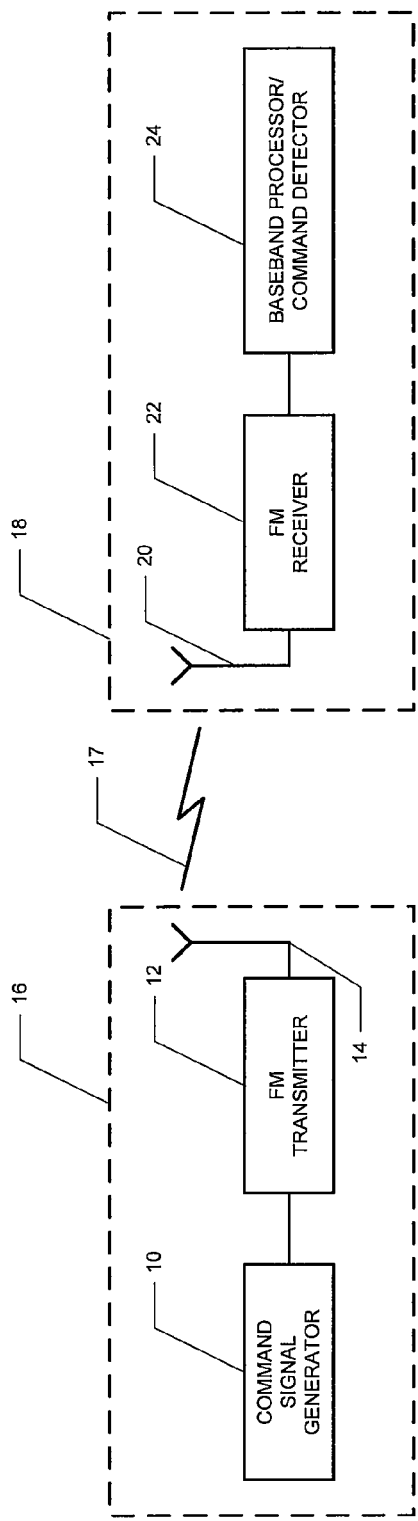
FIG. 1 is block diagram of a Command Destruct Subsystem.

In the description below, a receiver according to embodiments of the present invention is described in the context of detecting a CDS signal, including in the presence of high pulse interference, although the invention is not so limited and the receiver could be used to detect other types of signals. With reference to FIG. 1, the Command Destruct Subsystem comprises a command signal generator 10, an FM transmitter 12, and transmit antenna 14 at the Command Center 16, the radio frequency (rf) link 17 through the atmosphere and plume, and the command receiver 18. The receiver 18 comprises a SV antenna 20, a FM receiver 22, and a baseband processor/command detector 24.

The CDS signal consists of a sequence of eleven characters with each character comprised of two audio tone frequencies. These tones are transmitted for a duration of 6⅔ ms, followed by a dead interval of 1.9 ms for each of the first ten characters. The eleventh character has a time duration of 25.71 ms. The tones are selected from the set {7.35, 8.40, 9.45, 10.50, 11.55, 12.6, and 13.65} kHz. There is also a pilot tone at 15.45 kHz that is transmitted continuously independent of the command signal. Typically, an eleven-character arm command (similar to the CDS command) is sent first followed by the eleven-character CDS signal, so that both must be properly received in order for the vehicle to be destroyed.

The FM receiver 22 can be fixed-tuned to any selected frequency in the 400 MHz to 450 MHz frequency range and may include a FM discriminator. Each of the tones in the CDS signal has 30 kHz peak deviation. The IF bandwidth into the FM demodulator is 180 kHz.

Figure 2:
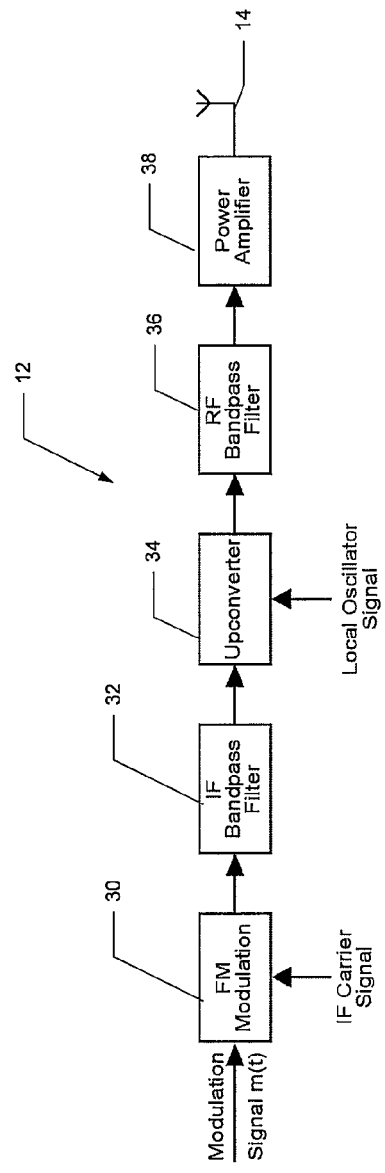
FIG. 2 is a block diagram of a FM transmitter.

FIG. 2 is a block diagram of the FM transmitter 12. The FM transmitter 12 may comprise a FM modulator 30, an intermediate frequency (IF) bandpass filter 32, an upconverter 34, and RF bandpass filter 36, a power amplifier 38, and the transmit antenna 14. The modulation signal m(t) shown in FIG. 2 may be the CDS signal where the application is for the Command Destruct Subsystem. The FM modulator 30 modulates the signal m(t) according to a frequency modulation scheme using an IF carrier signal. The IF bandpass filter 32 filters the output of the FM modulator 30 to remove signals outside the IF band. The upconverter 34 upconverts the IF modulation signal to RF using a signal from a local oscillator and the RF bandpass filter 36 filters the output of the upconverter 34 to remove signals outside the desired RF band. The power amplifier 38 amplifies the RF signal prior to transmission by the transmit antenna 14. The components of the FM transmitter 12 may be implemented using analog and/or digital circuit components.

Figure 3:
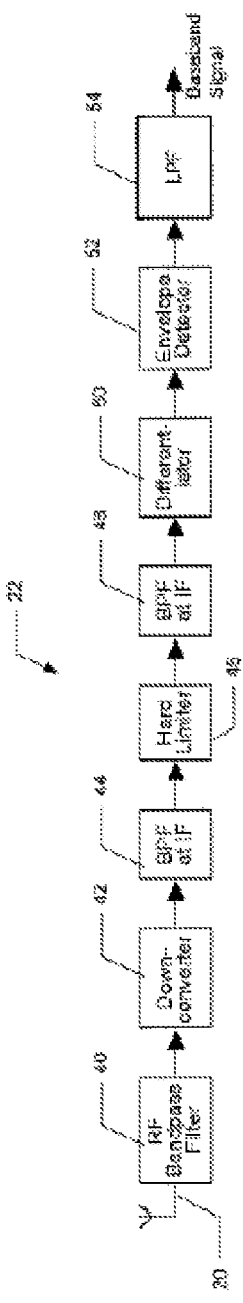
FIG. 3 is a block diagram of a FM receiver.

FIG. 3 shows a block diagram of a traditional FM receiver 22, which is of the limiter-discriminator type. The FM receiver 22 comprises: the receive antenna 20; a RF bandpass filter 40 for filtering the FM modulated signal received by the antenna 20 from the FM transmitter 12; a downconverter 42 for downconverting the modulated RF signal to IF; a first IF bandpass filter 44 for filtering the modulated IF signal at the desired IF range; a hard limiter 46 to reduce the dynamic range of the modulated IF signal; a second IF bandpass filter 48 for filtering the output from the hard limiter 46; a differentiator 50 for differentiating the output of the second IF bandpass filter 48; and an envelope detector 52 for detecting the demodulated FM signal from the differentiator 50. The output of the envelope detector 52 may be input to a low pass filter 54, which filters out the out-of-band noise. The components of the FM receiver 22 may be implemented using analog and/or digital circuit components.

Figure 4:
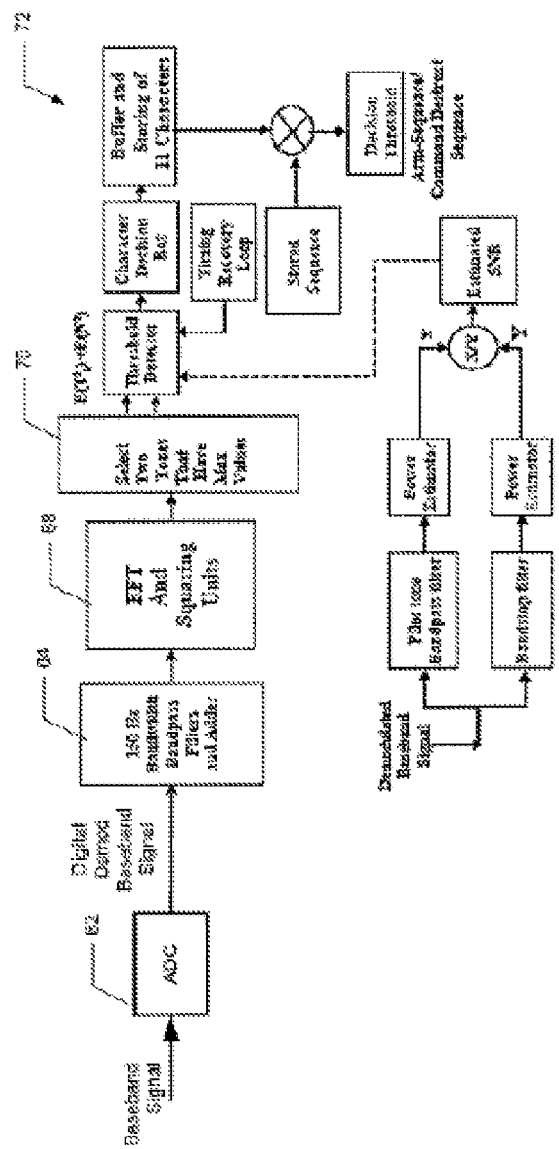
FIG. 4 is a command decoder

In the conventional Command Destruct Subsystem, the output of the FM demodulator 54 is input to a command decoder 60, an embodiment of which is shown in FIG. 4. The command decoder may comprise an analog-to-digital converter (ADC) 62 to digitize the analog baseband signal output from the FM demodulator 54. The command decoder 60 may also comprise a stage 64 with a bank of bandpass filters and an adder. The bandpass filters (e.g., 150 Hz bandpass filters) may have their center frequencies at the seven possible tones used in the CDS signal. The outputs of these filters are summed by the adder. The summed signal may then be input to a fast Fourier transform (FFT) processor 68. A detector 70 following the FFT processor 68 determines if a valid tone pair is present in any character period. In FIG. 4, $E(T_i^2)$ and $E(N^2)$ represent the estimated power in the $i^{th}$ tone and noise respectively. The command detection unit 72 determines if a valid command is present based on the match between the sequence of characters detected and a stored sequence of characters.

The received FM modulated signal after downconversion to the IF frequency by the downconverter 42 is given by:

$$v_{FM}(t) = A_c \cos\left(2\pi f_{IF} t + D_f \int_{-\infty}^{t} m(\tau) d\tau\right)_{filt} + n(t) + i_P(t) \qquad (1)$$

where $A_c$ is the carrier amplitude, $f_{IF}$ is the intermediate frequency, $D_f$ is the FM modulator sensitivity in rad/sec/volt, m(t) is the information signal, n(t) is white noise with one-sided power spectral density equal to $N_0$ watts/Hz, and $i_P(t)$ is the pulse interference term. The subscript 'filt' in equation (1) signifies that the FM signal has been filtered by both the transmit and receive bandpass filters of bandwidth $B_p$ equal to 180 KHz or higher. Thus, both n(t) and $i_P(t)$ are bandpass filtered processes. For the CDS signal, the information (modulation) m(t) signal is given by, $$m(t) = a_1 \cos(\omega_1 t) + a_2 \cos(\omega_2 t) + a_3 \cos(\omega_3 t) \qquad (2)$$

i.e., m(t) is sum of three tone signals with their respective amplitudes and frequencies given by $a_1, a_2, a_3$, and $\omega_1, \omega_2, \omega_3$. From the standard FM theory for relatively high SNR conditions, the FM demodulated signal (excluding the low pass filter) $s_0(t)$ is given by:

$$s_0(t) = K\left(\frac{D_f}{2\pi}\right) m(t) \qquad (3)$$

where K is some demodulator constant. In the absence of the interference term $i_P(t)$, the demodulator output noise $n_0(t)$ is colored with its two-sided power spectral density given by:

$$P_{n_0}(f) = \begin{cases} (K/A_c)^2 N_0 f^2; & |f| \leq B_T/2 \\ 0; & \text{otherwise} \end{cases} \qquad (4)$$

where $B_T$ denotes the transmission bandwidth.

The FM demodulator output is input to the set of tone bandpass filters 64 centered on the selected seven (7) tone frequencies with each filter of bandwidth B equal to 150 Hz. Note that the result is not affected if there is a lowpass filter in between the demodulator 54 and the tone filters 64. It is assumed that the lowpass filter, if any, has bandwidth higher than the maximum tone frequency. The output of the tone filter centered around $f_1$ is obtained from equations (2)-(3) and is given by:

$$s_{o1}(t) = \left(\frac{KD_f}{2\pi}\right) a_1 \cos(\omega_1 t) \qquad (5)$$

The noise power at the tone filter output with center frequency $f_1$ is given by:

$$\overline{n_{o1}^2} = 2 \int_{f_1-B/2}^{f_1+B/2} \left(\frac{K}{A_c}\right)^2 N_0 f^2 \, df \cong 2\left(\frac{K}{A_c}\right)^2 N_0 f_1^2 B \qquad (6)$$

Hence the output signal-to-noise power ratio for the tone filter, with its center frequency $f_1$, is given by:

$$\left(\frac{S}{N}\right)_{o1} = \left(\frac{KD_f}{2\pi}\right)^2 \frac{a_1^2}{2} \left(\frac{A_c}{K}\right)^2 \left(\frac{1}{2N_0 f_1^2 B}\right) \qquad (7)$$

$$= \left(\frac{A_c^2}{2N_0 B}\right) \left(\frac{D_f V_p}{2\pi}\right)^2 \frac{(a_1/V_p)^2}{2} \left(\frac{1}{f_1^2}\right)$$

where $V_p = \max_t |m(t)|$ is the peak modulation signal. Approximately $$V_p \cong (a_1 + a_2 + a_3) \qquad (8)$$

Defining the input tone SNR as the ratio $$\left(\frac{S}{N}\right)_{it} = \frac{A_c^2}{2N_0 B} \qquad (9)$$

and noticing that by definition $$\Delta f = \left(\frac{D_f V_p}{2\pi}\right)$$

is the peak frequency deviation in Hz, one obtains the following signal processing gain (SPG) for the tone 1:

$$(SPG)_1 \equiv \frac{(S/N)_{o1}}{(S/N)_{it}} = \frac{1}{2}\left(\frac{\Delta f}{f_1}\right)^2 \left(\frac{a_1}{a_1+a_2+a_3}\right)^2 \qquad (10)$$

For the case of equal amplitudes, $a_1 = a_2 = a_3$, as is applicable to the CDS signal, then $$(SPG)_1 \equiv \frac{(S/N)_{o1}}{(S/N)_{it}} = \frac{1}{18}\left(\frac{\Delta f}{f_1}\right)^2 \qquad (11)$$

Equation (11) shows that the tone bandpass filter output SNR varies inversely with the square of tone frequency. For example, for $f_1=15$ KHz, $(SPG)_1=2$ (3 dB) and for $f_1=7.35$ KHz, $(SPG)_1=8.3$ (9.2 dB) as the peak frequency deviation for the SLR signal is equal to 90 KHz. Equation (11) has been derived for the case of high SNR in the receiver IF bandwidth. If the SNR is not sufficiently high, the performance is much worse than would be predicted on the basis of equation (11) due to a threshold effect due to the presence of the click noise generated at lower SNRs.

Figure 5:
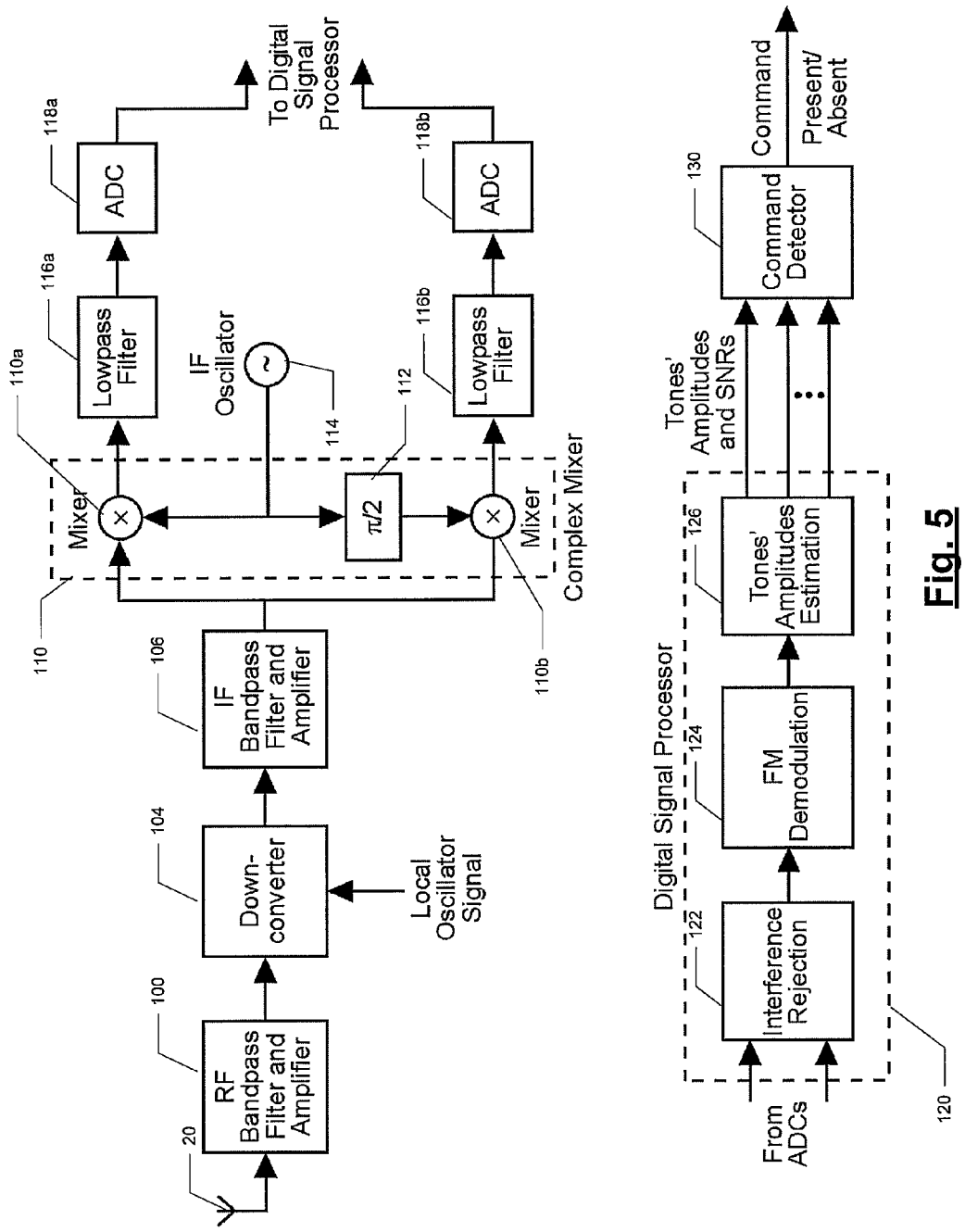
FIG. 5 is a block diagram of a receiver according to various embodiments of the present invention.

FIG. 5 is a block diagram of a FM receiver 22 according to various embodiments of the present invention. As shown in the illustrated embodiment, the FM receiver 22 may comprise a receive antenna 20, which receives the modulated RF signal transmitted by the FM transmitter 12. The signal may be received by the FM receiver 22 in the presence of both interference and noise. The noise in general is contributed both by the antenna 20 and the FM receiver 22.

The received signal, after being filtered by an RF bandpass filter and amplified by an amplifier of BPF/amplifier stage 100, is down converted to an IF frequency by a downconverter 104, which receives a local oscillator signal at its other input. The output of the downconverter 104 is filtered by an IF bandpass filter with a center frequency equal to $f_{IF}$ and amplified by an amplifier at IF BPF/amplifier stage 106.

The resulting IF signal is further downconverted to a complex baseband signal by a complex mixer 110. In the illustrated embodiment, the complex mixer 110 is comprised of two mixers 110a-b and a $\pi/2$ phase shifter 112. An IF local oscillator signal from an IF local oscillator 114 is input to the complex mixer 110, together with the output of the IF bandpass filter/amplifier 106. The complex mixer 110 produces two baseband output signals; one from each mixer 110a-b. The two real baseband output signals of the complex mixer 110 are filtered by low pass filters 116a-b respectively. The outputs of the lowpass filters 116a-b, termed in-phase and quadrature baseband signals respectively, are input to respective ADCs 118a-c to digitize the baseband signals. The two resulting digitized baseband signals constitute respectively the real and imaginary parts of the digital complex baseband signal, which, in various embodiments, are input to a digital signal processor (DSP) 120 of the receiver 22.

The DSP 120 may comprise three stages: an interference rejection stage 122; a FM demodulator stage 124; and a tones' amplitudes estimation stage 126. The tones' amplitudes estimation stage 126 is sometimes referred to herein as a decoder stage or simply decoder. In various embodiments, one or more stages 122-126 of the DSP 120 may be omitted. For example, in one embodiment, the interference rejection stage 122 may be omitted. In another embodiment, the demodulator stage 124 may be omitted. In yet another embodiment, the decoder stage 126 may be omitted. In yet other embodiments, more than one of the stages is omitted.

The DSP 120 may comprise a processing unit and a memory unit. The memory unit may comprise data memory and program memory. The processing unit of the DSP 120 may execute instruction code stored in the program memory to digitally manipulate the data stored in the data memory. The instruction code may cause the DSP 120 to perform the processes of the stages 122, 124, 126 described below. The DSP 120 may also have I/O ports for receiving and outputting digital signals. The DSP 120 may be implemented as an integrated circuit comprising the processing unit and the memory unit. In other embodiments, separate, discrete processor and memory units may be used. FIG. 5 shows one DSP 120. In other embodiments, more than one DSP 120 may be used. For example, in one embodiment, each of the stages 122, 124, 126 may have its own dedicated DSP 120.

The interference rejection stage 122 of the DSP 120 may first process digitized baseband signals from the ADCs 118a-b for interference mitigation. The output of the interference rejection stage 122 is input to the digital FM demodulator stage 124 to recover the baseband information signal m(t). Even with the mitigation of the interference by the interference rejection stage 122, the recovered baseband information signal m(t) may be corrupted by some residual interference. To further ameliorate the effect of the interference, in various embodiments, the possibly corrupted recovered baseband information signal m(t) is input to the tones' amplitudes estimation stage 126, which digitally processes the recovered baseband information signal so as to estimate the amplitudes of the transmitted pilot and character tones of the CDS signal in a manner such that the impact of any residual interference is minimized on the amplitude estimates of the pilot and character tones.

In a conventional receiver, such as shown in FIG. 4, when a pulse interference, denoted $i_P(t)$, is present that has much higher power than the FM signal power and its spectrum overlaps with that of the FM signal, either partially or completely, the tone filter 64 output SNR will be very poor as may be anticipated from equation (11) as the $(S/N)_{it}$ will now be much smaller than 1. In fact, under such poor SNR conditions, the result will be much worse than predicted by equation (11) on the basis of the SNR threshold mentioned above. Traditionally, when high power interference is present, the receiver is turned off with a blanking pulse. However, this also results in a complete loss of the information during the blanking pulse. In many applications, such an information loss is unacceptable In contrast, the stages of the DSP 120, according to various embodiments, provide an effective mitigation technique. The description below provides an example of the mitigation technique. In the first instance, only a single tone modulation at the pilot tone is considered. The interference is modeled by a FM chirp pulse with some center frequency, duration, chirp rate, and power level, with these parameters otherwise possibly unknown to the FM receiver.

The pulse interference at the output of the IF stage may be expressed as $$i_P = A_P \cos[\omega_{IF}t + 2\pi(f_P t + \alpha t^2)] \quad (12)$$

where $A_P$ is the pulse amplitude, $F_p$ is the frequency offset, and $2\alpha$ is the chirp rate in Hz/sec. It may be easily seen that the worst case interference will occur if $f_P=0$, i.e., when the nominal pulse frequency coincides with that of the FM signal carrier frequency and the center of the pulse coincides with the center of the CDS signal in time.

The mitigation technique employed by the DSP 120, in various embodiments, is based on signal cancellation based on a cross correlation technique. In one embodiment, the received signal after downconversion to an intermediate frequency $f_{IF}$, and denoted by $v_{FM}(t)$, is further down converted to an equivalent complex baseband signal $g_r(t)$ using the complex mixer 110 shown in FIG. 5. The in-phase and quadrature components of the baseband signal, denoted by $x_r(t)$ and $y_r(t)$ respectively, are given by $$x_r(t) = 2v_{FM}(t)\cos(\omega_{IF}t)|_{LPF} \quad (13)$$
$$= A_c \cos\left(D_f \int_{-\infty}^{t} m(\tau)d\tau\right)_{filt} + A_P \cos(\omega_p t + 2\pi\alpha t^2)_{filt} + x_n(t)$$

$$y_r(t) = -2v_{FM}(t)\sin(\omega_{IF}t)|_{LPF} \quad (14)$$
$$= A_c \sin\left(D_f \int_{-\infty}^{t} m(\tau)d\tau\right)_{filt} + A_P \sin(\omega_p t + 2\pi\alpha t^2)_{filt} + y_n(t)$$

with $\omega_{IF}=2\pi f_{IF}$ and $\omega_P=2\pi f_P$. In equations (13) and (14), the subscript "LPF" denotes the low pass filter 116a-b following the complex mixer 110, and "filt" denotes the effect of the front end bandpass filters 100, 106. The terms $x_n(t)$ and $y_n(t)$ respectively denote the in-phase and quadrature components of the noise process n(t) with the following representation $$n(t) = x_n(t)\cos(\omega_{IF}t) - y_n(t)\sin(\omega_{IF}t) \quad (15)$$

The baseband complex envelope $g_r(t)$ of the received signal is $$g_r(t) = x_r(t) + jy_r(t) \quad (16)$$

Both baseband signals $x_r(t)$ and $y_r(t)$ may be sampled at a rate $F_s$, such as 2.1 Msps, and converted into digital form. The sampled signals $x_r(n)$ and $y_r(n)$, with n denoting the discrete time index and with the sampling interval $T_s=1/F_s$, may be processed by the DSP 120 to reduce the interference term as described below.

Figure 6:
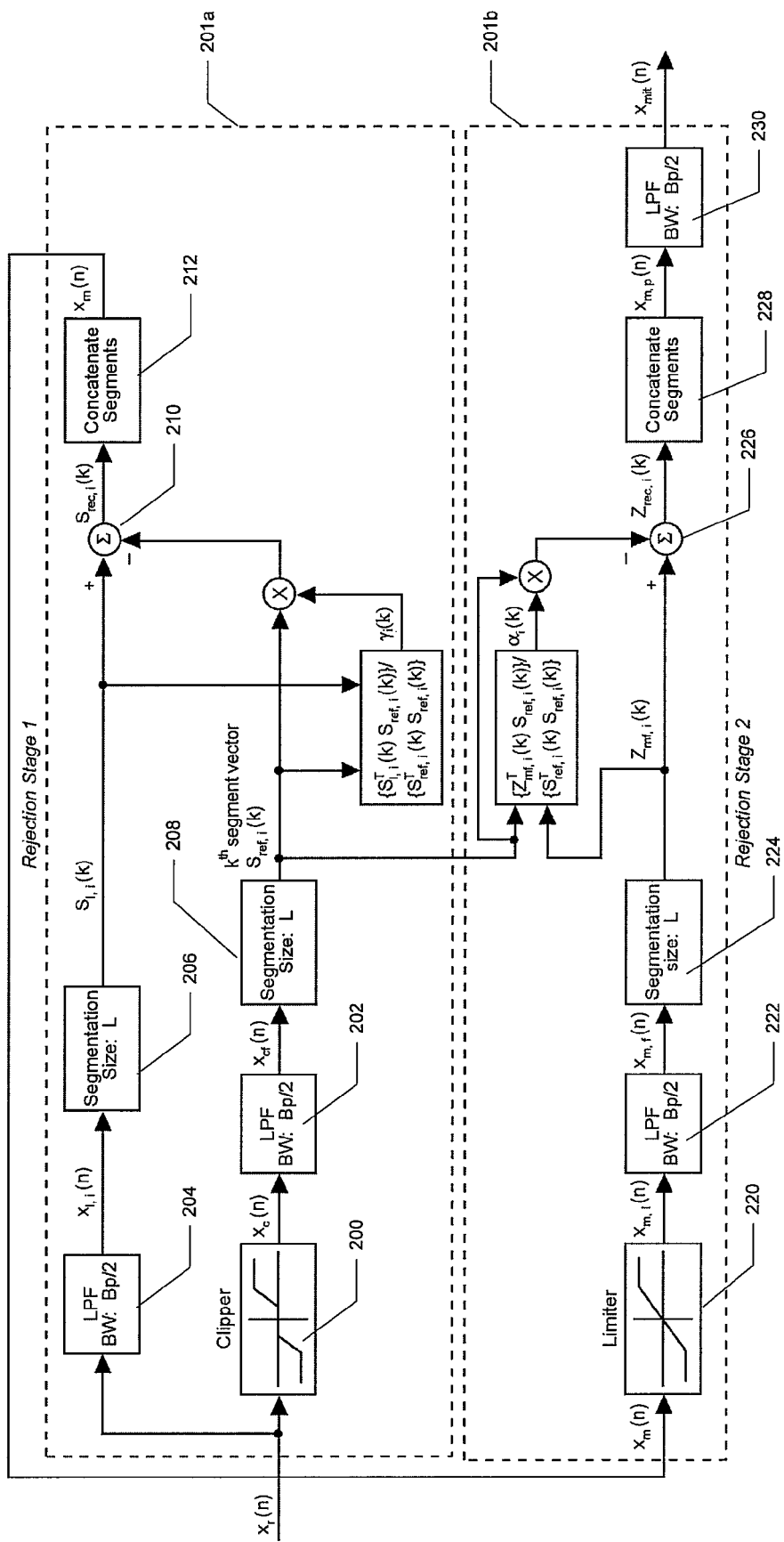
FIG. 6 is a block diagram of an interference mitigation stage of the receiver of FIG. 5 according to various embodiments of the present invention.

FIG. 6 is a diagram illustrating the operation of the interference rejection stage 122 of the DSP 120 according to various embodiments of the present invention. As shown in the embodiment of FIG. 6, the interference rejection stage 122 may comprise a first rejection stage 201a and a second rejection stage 201b. FIG. 6 also merely shows the stages for the in-phase component $x_r(n)$ output from the ADC 118a. In a preferred embodiment, there are similar stages for the quadrature component $y_r(n)$ output from the ADC 118b, which are not shown in FIG. 6 for the sake of convenience and simplicity.

As suggested by FIG. 6, both the signals $x_r(t)$ and $y_r(t)$ may first be clipped by a clipper 200 in the first rejection stage 201a according to the following transfer characteristics $$q(x) = \begin{cases} 0; & |x| < V_L \\ (|x| - V_L)\text{sgn}(x); & V_L \le |x| < V_H \\ (V_H - V_L)\text{sgn}(x); & V_H > |x| \end{cases} \quad (17)$$

where x and q(x) represent the input and output respectively of the clipper 200, and $V_L$ and $V_H$ are the lower and upper thresholds of the clipper 200. In the signal processing described by equation (17), the values of $V_L$ and $V_H$ are selected according to some order of magnitude estimates of $A_c$ and $A_P$. In the simulation examples presented below, it is assumed that $A_P \gg A_c$ and that the threshold levels are selected as $V_L \approx 5\hat{A}_c$, with $V_H \approx \hat{A}_P/2$, where the operator ^ denotes the estimates of the respective quantities. Note however, that these values are only suggestive and the algorithm is relatively insensitive to some appropriately selected threshold levels.

The clipped versions of the received quadrature components $x_r(n)$ and $y_r(n)$, denoted by $x_c(n)$ and $y_c(n)$ respectively, may then be filtered by lowpass filters 202 of bandwidth $B_p/2$. The output of the filters 202 are denoted by $x_{cf}(n)$ and $y_{cf}(n)$ respectively. Also, the signals at the clipper input are filtered directly by low pass filters 204 with the same transfer function as that of the filters 202 used to filter the clipped signals. Such filtered in-phase and quadrature signals are denoted by $x_I(n)$ and $y_I(n)$ respectively, where the suffix I signifies that these signals have the pulse interference present in them.

The interference may then be eliminated using correlation techniques. The following elimination scheme is one embodiment of an elimination scheme according to the present invention, although the present invention is not so limited and different correlation-based elimination techniques may be utilized in other embodiments of the present invention.

In one embodiment, the output $x_{I,i}(n)$ (and the output $y_{I,i}(n)$ in the quadrature stages) from the LPF 204 is segmented into sizes of length L by segmentation stage 206. Also, the output $x_{cf}(n)$ (and the output $y_{cf}(n)$) from the LPF 202 is segmented into sizes of length L by segmentation stage 208. Denoting by $S_{ref,i}$ the vector comprised of the first L samples of the in-phase signal $x_{cf}(n)$, i.e., $S_{ref,i}=[x_{cf}(1) x_{cf}(2) \ldots x_{cf}(L)]^T$, where T denotes matrix transpose, and similarly with $S_{I,i}=[x_f(1) x_f(2) \ldots X_f(L)]^T$, then the processed signal vector $S_{rec,I}$, output from the summing junction 210, is given by $$S_{rec,i}=S_{I,i}-\gamma_i S_{ref,i}; \gamma_i = S_{I,i}^T S_{ref,i}/(S_{ref,i}^T S_{ref,i}) \quad (18)$$

Similarly, the quadrature phase signal vector $S_{I,q}$ is defined in terms of the sampled signal $y_f(n)$ and is processed as per equation (19):

$$S_{rec,q}=S_{I,q}-\gamma_q S_{ref,q}; \gamma_q = S_{I,q}^T S_{ref,q}/(S_{ref,q}^T S_{ref,q}) \quad (19)$$

The other L length segments (the last segment may be of length less than L) may be processed in exactly the same manner as the first segment to obtain the complete signal.

To further reduce the interference from the desired signal, the signals obtained by the correlation operation in equations (18) and (19) may be processed by the DSP 120 in a second iteration as follows. Denoting by $x_m(n)$ the signal sequence obtained by concatenating the $S_{rec,i}$ vectors obtained by applying the decorrelation operation in equation (18) to various segments of the signal $x_f(n)$ at concatenation stage 212, then the signal $x_m(n)$ may processed in the second rejection stage 201b according to various embodiments as follows. First the signal $x_m(n)$ is input to a limiter 220 with its transfer characteristics L(x) given by equation (20) below.

$$L(x) = \begin{cases} x; |x| < V_{H_2} \\ V_{H_2} \text{sgn}(x); |x| > V_{H_2} \end{cases} \quad (20)$$

where x and L(x) represent the limiter input and output respectively, and $V_{H2}$ is the limiter threshold level. $V_{H2}$ preferably is selected equal to an accurate estimate of $A_c$ or an appropriate over bound on $A_c$. The limiter output signal denoted by $x_{m,l}(n)$ is filtered by a low pass filter 222 of bandwidth $B_p/2$. The filter output denoted by $x_{m,f}(n)$ is now decorrelated with the reference signal $x_f(n)$ in a manner similar to that in equation (18). The output $x_{m,f}(n)$ from the LPF 222 is segmented into sizes of length L by segmentation stage 224. Denoting by $Z_{mf,i}$ the vector comprised of the first L samples of the signal $x_{m,f}(n)$, then the result of this second pass of the decorrelation operation results in the following signal $Z_{rec,I}$ at the output of summing junction 226:

$$Z_{rec,i}=Z_{mf,i}-\alpha_i S_{ref,i}; \alpha_i = Z_{mf,i}^T S_{ref,i}/(S_{ref,i}^T S_{ref,i}) \quad (21)$$

where $S_{ref,i}$ is the same reference signal vector as in equation (18). The other L length segments of the signal $x_{m,f}(n)$ may be processed in exactly the same manner as the first segment to obtain the complete signal denoted by $x_{mit}(n)$ where the suffix mit connotes interference mitigated signal. The $Z_{rec,I}$ segments may be concatenated by concatenation block 228 to produce the signal $x_{m,p}(n)$, which may be filtered by low pass filter 230 of bandwidth $B_p/2$ to produce $x_{mit}(n)$.

For the quadrature component, denoting by $y_m(n)$ the signal sequence obtained by concatenating the $S_{rec,q}$ vectors obtained by applying the decorrelation operation of equation (19) to various segments of the signal $y_f(n)$, then the signal $y_m(n)$ may be processed exactly in the same manner as the processing of $x_m(n)$. Denoting by $y_{m,f}(n)$ the signal obtained by limiting the signal $y_m(n)$ by the limiter L(x) 220 followed by filtering the resulting signal by a low pass filter 222 of bandwidth B/2, the signal $y_{m,f}(n)$ is segmented in to segments of length L. Denoting by $Z_{mf,q}$ the vector comprised of the first L samples of the signal $y_{m,f}(n)$, then the result of this second pass of the decorrelation operation results in the following signal $Z_{rec,q}$ $$Z_{rec,q}=Z_{mf,q}-\alpha_q S_{ref,q}; \alpha_q = Z_{mf,q}^T S_{ref,q}/(S_{ref,q}^T S_{ref,q}) \quad (22)$$

The other L length segments of the signal $y_{m,f}(n)$ may processed in exactly the same manner as the first segment to obtain the complete interference mitigated signal denoted by $y_{mit}(n)$ where the suffix mit connotes interference mitigated signal. In principle, the decorrelation operation of equations (21)-(22) may be repeated to achieve increased interference rejection.

In various embodiments, the signals $x_{mit}(n)$ and $y_{mit}(n)$ from the interference rejection stage 122 are input to the FM demodulator stage 124 of the DSP 120 to recover the baseband information signal m(t) or its sampled version. In one embodiment, a conventional (or traditional or standard) FM ("SFM") digital demodulation scheme may be used by the FM demodulator stage 124. In another embodiment, a so-called generalized FM (GFM) demodulator may be used. More details about such a GFM demodulator are provided in U.S. patent application Ser. No. 12/536,078, filed Aug. 5, 2009, by the present inventor, entitled "Generalized Frequency Modulation," which is incorporated herein by reference in its entirety.

In a traditional digital SFM demodulator the phase demodulation term θ(n) may be obtained by $$\theta(n)=\tan_2^{-1}(x_{mit}(n),y_{mit}(n)) \quad (23)$$

where $\tan_2^{-1}$ denotes the four quadrant inverse tangent function. The frequency demodulated signal is then obtained by differencing the phase demodulation signal θ(n), i.e., the demodulated signal $s_0(n)$ is given by $$s_0(n)=K[\theta(n)-\theta(n-1)]; n=1,2,\ldots \quad (24)$$

for any appropriately selected constant K.

However, as the operation of $\tan_2^{-1}$ function results in mod 2π version of the true phase, the difference between the true phase, denoted by $\theta_{un}(n)$ with the suffix "un" signifying unwrapped phase, and θ(n), denoted by $\theta_{un}(n)-\theta(n)$, is a piecewise constant function which has jumps of ±2π at those values of n where $\theta_{un}(n)$ crosses boundaries (2k+1)π for any integer k. Thus, the difference signal will exhibit impulses of magnitude equal to multiples of 2 π at the points of discontinuities. Therefore, in the traditional FM demodulators, it is necessary to identify and eliminate these jumps from $s_0(n)$, an operation that is sensitive to noise and interference, especially in relatively low SNR conditions.

Figure 7:
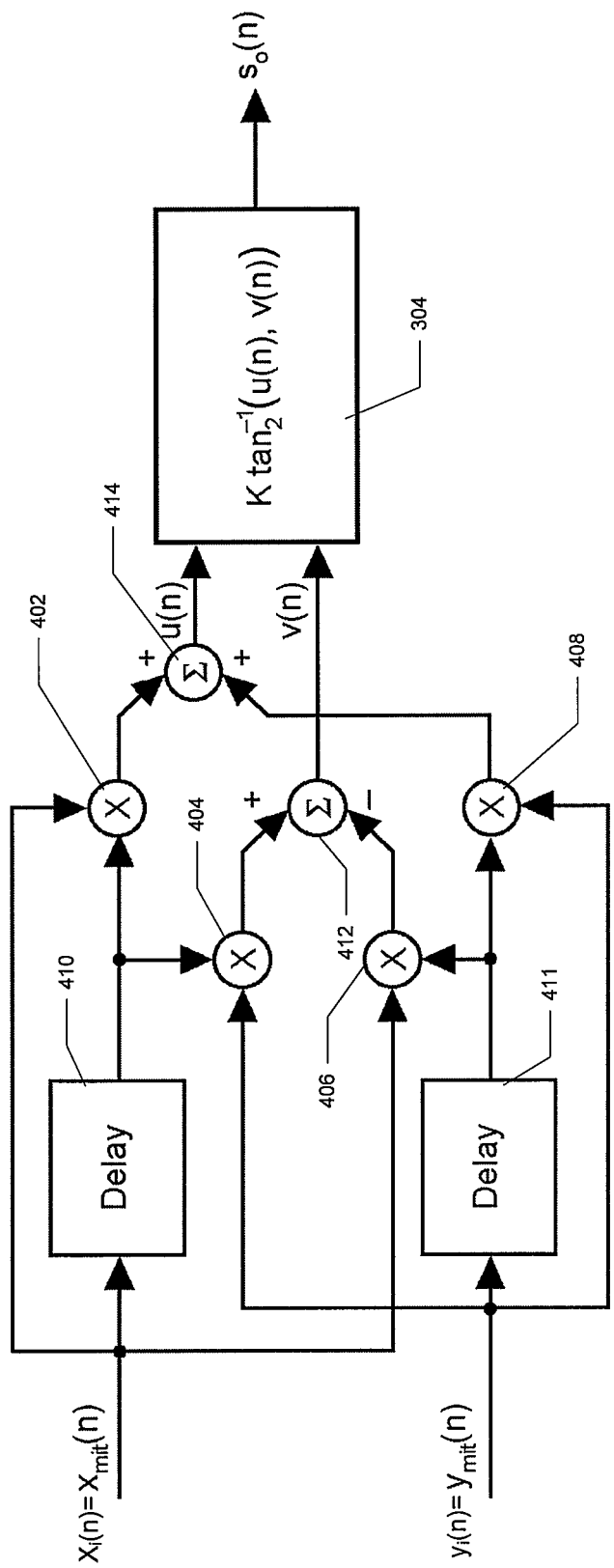
FIGS. 7 and 7A are block diagrams illustrating demodulators according to various embodiments of the present invention.

In another embodiment, as shown in FIG. 7, to avoid the problem of such phase discontinuities, the implementation of the FM demodulator 122 reverses the order of the differencing and the $\tan_2^{-1}$ operation as follows $$u(n)=x_{mit}(n)x_{mit}(n-1)+y_{mit}(n)y_{mit}(n-1) \quad (25)$$

$$v(n)=y_{mit}(n)x_{mit}(n-1)+x_{mit}(n)y_{mit}(n-1) \quad (26)$$

Considering only the signal part of the $x_{mit}(n)$ and $y_{mit}(n)$ in equations (25) and (26), these are equal to $A_c \cos(\theta_s(n))$ and $A_c \sin(\theta_s(n))$ where $\theta_s(n)$ denotes the sampled version of the signal phase modulation $$\theta_s(t) = D_f \int_{-\infty}^t m(\tau) d\tau$$

as in equation (1). Using simple trigonometric identities, it follows that u(n) and v(n) are respectively equal to cos(Δθ(n)) and sin(Δθ(n)) with $\Delta\theta(n) \equiv \theta(n)-\theta(n-1)$. Thus $$s_0(n) \equiv K[\theta(n)-\theta(n-1)]=K\tan_2^{-1}(u(n),v(n)) \quad (27)$$

As the sampling rate is much higher than the bandwidth of the information signal m(t), the phase $\Delta\theta(n)$ will be much smaller than $\pi$ in magnitude and the problem of phase discontinuities does not arise. If the sampling rate is chosen to be much higher compared to the bandwidth $B_p$, similar result applies to the case when noise is included in the analysis. The output of the FM demodulator $s_0(n)$ is processed by the tone amplitude estimator stage 126 described below.

As shown in FIG. 7, the inputs to FM demodulator stage 124 are shown as a generic in-phase component, $x_i(n)$, and a generic quadrature component, $y_i(n)$. The outputs are shown as u(n) and v(n), which are input to the four quadrant inverse tangent 304. The input $x_i(n)$ is provided to multipliers 402 and 406, as well as to a one-cycle delay 410. The output of the one-cycle delay 410, which may effectively be $x_i(n-1)$, is provided to multipliers 402 and 404. Similarly, the input $y_i(n)$ is provided to mixing junctions 404 and 408, as well as to the one-cycle delay 411. The output of the delay 411, which may effectively be $y_i(n-1)$ is provided to multipliers 406 and 408. The outputs of mixing junctions 402 and 408 may be provided to summing junction 414, resulting in $x_{i+1}(n)$=u(n). Similarly, the outputs of multipliers 404 and 406 may be provided to summing junction 412, resulting in $y_{i+1}(n)$=v(n). In some embodiments, the delay blocks 410, 411 may be configured to delay for more than one cycle, allowing the differencer to find the instantaneous phase difference over non-consecutive samples. This means that the outputs of the delays may effectively be $x_i(n-i)$ and $y_i(n-i)$ where i may be 2 or 3 or more.

Figure 7A:
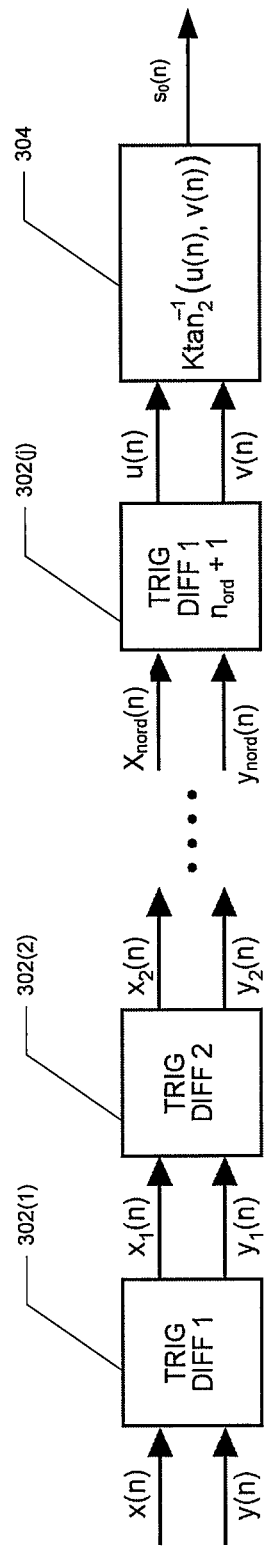

FIG. 7A illustrates one embodiment of a GFM demodulator 124. As described above, the inputs to the GFM demodulator 124 may comprise the digitized in-phase, x(n), and quadrature, y(n), components of the complex modulated signal, output by the interference rejection stage 122 of the DSP 120. These inputs are provided to cascaded differencers 302(1), 302(2), 302(j). The number of differencers 302(j) in the GFM demodulator 124 may be equal to the order of the modulated signal plus one (e.g., $n_{ord}+1$). For example, according to various embodiments, the GFM demodulator 124 may be of order one or two, although higher orders may also be used. The output of each differencer 302(1-j) may be an instantaneous phase difference of the in-phase and quadrature components (e.g., a difference in phase between consecutive digital samples). When the complete cascade of differencers 302(1-j) has been applied, the result may be a complex output signal with an in-phase component u(n) and a quadrature component v(n), where the output signal has an instantaneous phase that varies according to the information signal m(t). A four quadrant inverse tangent 304 may be applied to the output signal to reconstruct the information signal in terms of digital time, n. In one embodiment, the differencers 302(1-j) may be trigonometric differencing blocks, such as shown above in connection with FIG. 7.

As the interference $i_P(t)$ in equation (1) is a highly non-stationary process (e.g., the "spectral content" of the interference is changing with time), the signal-to-residual interference ratio at the FM demodulator output is also a function of time. Thus, the performance of traditional narrowband tone filters and or FFT processors is in general very poor in such a non-stationary environment. In one embodiment, a signal processing method based on the maximal ratio combining technique may be used for a more precise estimation of the amplitudes of various tones including the pilot tone. In embodiments involving CDS signals, the estimation process may involve two steps corresponding to the pilot tone and code character tone estimation, as described below.

According to various embodiments, the output of the FM modulator $s_0(n)$ is divided by the tones' amplitudes estimation stage 126 of the DSP 120 into segments of length $N_p$ selected such that $N_p$ is equal to integer multiple of the pilot tone period. In the simulations presented below, $N_p$ is equal to 1400. In segmenting the signal $s_0(n)$, the last segment may be of a length less than $N_p$ in which case it is augmented by zeros to bring its length equal to $N_p$. Denoting by $V_{p,k}$ the $n^{th}$ such segment, i.e., $$V_{p,k}=[s_0(k_1),\ldots,s_0(kN_p)]^T; k_1\equiv(k-1)N_p+1; k=1,2,\ldots Mp \quad (28)$$

where Mp denotes the number of segments. Also, the sampled version of the pilot signal may be defined as $$V_{p,I}=[1, \cos(2\pi f_p T_s),\ldots, \cos(2\pi(N_{p-1})f_p T_s)]^T \quad (29a)$$

$$V_{p,Q}=[1, \sin(2\pi f_p T_s),\ldots, \sin(2\pi(N_{p-1})f_p T_s)]^T \quad (29b)$$

where $f_p$ denotes the pilot tone frequency. The signal segments $V_{p,k}$ are correlated with the reference signals $V_{p,I}$ and $V_{p,Q}$ to obtain the amplitude estimates of the in-phase and quadrature components of the pilot signal as $$a_{p,k}=2V_{p,k}^T V_{p,I}/N_p; b_{p,k}=2V_{p,k}^T V_{p,Q}/N_p; k=1,\ldots,M_p \quad (30)$$

The estimates of the amplitude $A_{p,k}$ and power $P_{p,k}$ in the pilot tone signal based on the signal segment k are given by $$A_{p,k}=\sqrt{[a_{p,k}^2+b_{p,k}^2]};\quad P_{p,k}=A_{p,k}^2/2 \quad (31)$$

In a simpler incoherent implementation, the power levels $P_{p,k}$ of various segments can be averaged to yield the final estimate of the received pilot signal. However, as indicated above, the performance obtained by this approach is in general poor.

Figure 8A:
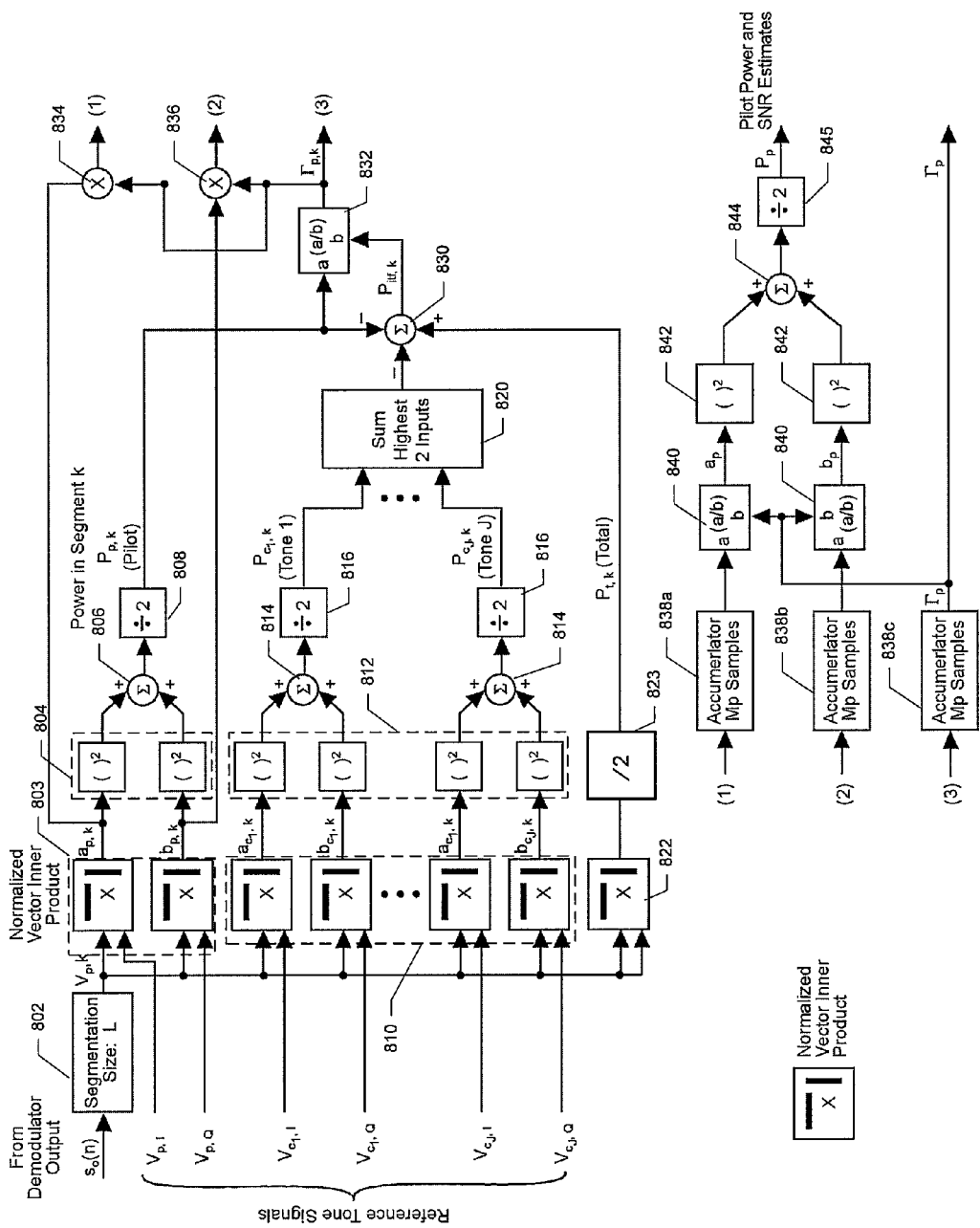
FIGS. 8A and 8B are block diagrams illustrating a tones' amplitudes estimation stage according to various embodiments of the present invention.
Figure 8B:
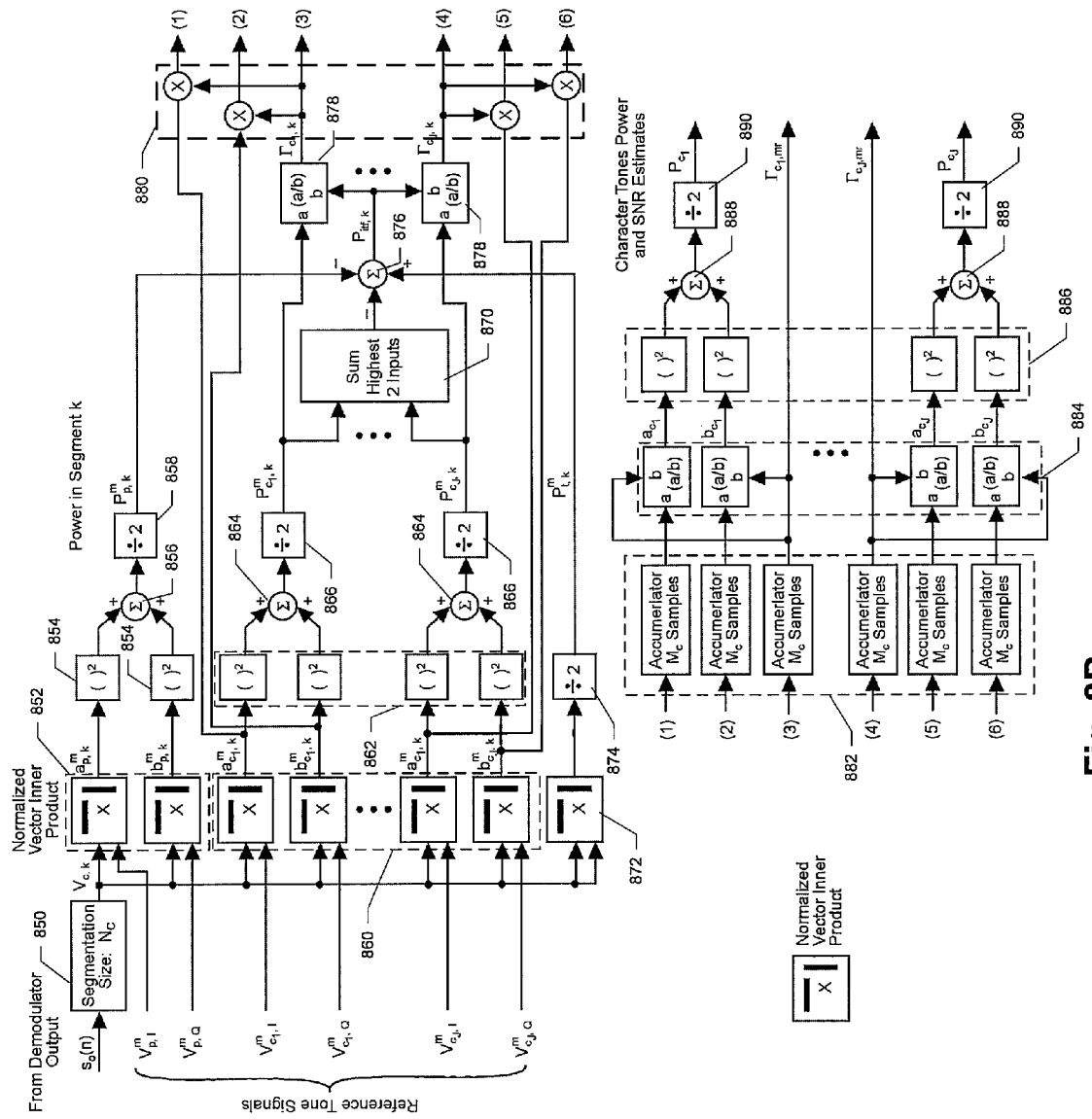

Instead, according to various embodiments, a maximal ratio combining approach may be used. FIGS. 8A-B are block diagrams collectively illustrating the operation of tones' amplitudes estimation stage 126 of the DSP 120 according to such an embodiment of the present invention. FIG. 8A shows the output signal of the FM modulator $s_0(n)$ being divided into segments of length $N_p$(or L) by segmentation block 802 per equation (28) above. FIG. 8 also shows the output of the segmentation block 802, $V_{pk}$ (see equation (28)) being correlated with the pilot reference tone signals $V_{p,I}$ and $V_{p,Q}$, at correlation blocks 803, to obtain the amplitude estimates of the in-phase ($a_{p,k}$) and quadrature ($b_{p,k}$) components of the pilot signal, per equation (30) above. The squaring operation blocks 804, the summing block 806, and the division block 808 produce the estimate of the power $P_{p,k}$ in the pilot tone signal based on the signal segment k.

In order to apply the maximal ratio combining approach, the signal-to-interference plus noise ratio is estimated for each segment by computing the power in the character tones that may be present and then subtracting this power from the total power in the segment. Denoting by $f_{c_j}$ the $j^{th}$ tone frequency for j=1, 2, . . . , 7, the various reference character signals may be defined as $$V_{c_j,I}=[1, \cos(2\pi f_{c_j} T_s),\ldots, \cos(2\pi(N_{p-1})f_{c_j} T_s)]^T \quad (32a)$$

$$V_{c_j,Q}=[1, \sin(2\pi f_{c_j} T_s),\ldots, \sin(2\pi(N_{p-1})f_{c_j} T_s)]^T \quad (32b)$$

These signals are correlated with $V_{p,k}$ of equation (28), i.e., the output of segmentation block 802, by corresponding correlation blocks 810 to yield $$a_{c_j,k}=2V_{p,k}^T V_{c_j,I}/N_p; b_{c_j,k}=2V_{p,k}^T V_{c_j,Q}/N_p; k=1,\ldots,M_p; j=2,\ldots,7 \quad (33)$$

The estimates of the amplitude and the power of the character tone signals for each tone may be determined per equation (34) below, $$A_{c_{j,k}} = \sqrt{[a_{c_{j,k}}^2 + b_{c_{j,k}}^2]};$$

$$P_{c_{j,k}} = A_{c_{j,k}}^2/2 \quad (34)$$

using squaring blocks 812, summing blocks 814, and division blocks 816.

The total power $P_{c,k}$ present in the character tones during any time segment k may be estimated as the sum of the highest two values $P_{c_{j,k}}$, which may be determined by operation block 820. The total signal, interference, and noise power present in the segment k, determined by correlation block 822, and division block 823 is given by $$P_{t,k} = \frac{1}{N_p}\|V_{p,k}\|^2 \quad (35)$$

where $\|\ \|$ denotes the vector norm. The pilot signal-to-interference plus noise power ratio $\Gamma_{p,k}$ in the segment k is then estimated as $$\Gamma_{p,k} = P_{p,k}/[P_{t,k} - P_{c,k} - P_{p,k}] \quad (36)$$

Summation block 830 may compute the quantity $[P_{t,k} - P_{c,k} - P_{p,k}]$, and division block 832 may divide $P_{p,k}$ by the output of the summation block 830 to produce the estimated pilot signal-to-interference plus noise power ratio in segment k, $\Gamma_{p,k}$.

In the estimation of $\Gamma_{p,k}$ from equation (36), $\Gamma_{p,k}$ may become negative due to estimation errors. This will occur if the residual interference plus noise power estimated by the denominator term in equation (36) is close to zero and thus the signal-to-noise ratio is relatively high. In this case, the $\Gamma_{p,k}$ terms with negative values may be replaced by some appropriate positive estimate. In the simulations presented below, this estimate is selected equal to a constant greater than 1 times the maximum taken over the positive $\Gamma_{p,k}$ terms with the constant selected equal to ten (10). The combining weights in the following are based on the $\Gamma_{p,k}$ values modified in this manner.

A weighted sum of the in-phase and quadrature signal amplitude estimates $a_{p,k}$ and $b_{p,k}$ is obtained as $$a_p = \sum_{k=1}^{M_p} w_k a_{p,k};$$

$$b_p = \sum_{k=1}^{M_p} w_k b_{p,k} \quad (37)$$

with $a_{p,k}$ and $b_{p,k}$ given by equation (30), and output by the correlation blocks 803, and for some appropriate weights $w_k$, $k=1, 2, \ldots, M_p$. In another, simpler equal gain combining approach, the weights are all selected equal to $1/M_p$. According to another embodiment, an optimum maximal ratio combining approach is used where the weights are given by $$w_k = \Gamma_{p,k}/\sum_{k=1}^{M_p}\Gamma_{p,k}; \quad (38)$$

$$k = 1, 2, \ldots, M_p$$

In the embodiment shown in FIG. 8A, the in-phase and quadrature signal amplitude estimates, $a_{p,k}$ and $b_{p,k}$, are multiplied respectively by the estimated pilot signal-to-interference plus noise power ratio in segment k, $\Gamma_{p,k}$, by multipliers 834, 836, respectively. The outputs of the multipliers 834, 836 are input to accumulators 838a-b, which accumulates the SNR-weighted in-phase and quadrature signal amplitude estimates for $M_p$ samples. Similarly, the estimated pilot signal-to-interference plus noise power ratio in segment k, $\Gamma_{p,k}$, is accumulated over $M_p$ samples by an accumulator 838c (see equation (40) below). The final estimate of the pilot tone power $P_p$ is determined by dividing the output of the accumulators 838a-b respectively by the total SNR, $\Gamma_p$, using division blocks 840, to produce $a_p$ and $b_p$, respectively, as shown in FIG. 8A. The signals $a_p$ and $b_p$ are squared respectively by squaring blocks 842, with the results being summed by summing block 844 and divided by two by division block 845 to produce the final estimate of the total power $P_p$.

The final estimate of the pilot signal amplitude is given by $$A_p = \sqrt{[a_p^2 + b_p^2]} \quad (39)$$

An estimate of the signal-to-interference plus noise ratio of the final estimate when maximal ratio combining is used is given by $$\Gamma_{p,mr} = \sum_{k=1}^{M_p} \Gamma_{p,k} \quad (40)$$

The estimate of the pilot signal-to-interference plus noise power ratio in the baseband signal bandwidth $B_p$ (useful when only the pilot signal is present) is given by $$\Gamma_{p,bb} = \frac{1}{M_p}\sum_{k=1}^{M_p} \Gamma_{p,k} \quad (41)$$

In various embodiments, as shown in FIG. 8b, the procedure for the amplitude estimation of the character tones may be similar to that of the pilot tone except that the segment length $N_c$ for the character tone is different than $N_p$ for the pilot tones. According to various embodiments, the segment length in this case is selected to be an integer multiple (1/1050) sec that is an inverse of the greatest common divisor of all the character tone frequencies equal to 1050 Hz. In the simulations presented below, $N_c$ is selected equal to 2060 samples. The output of the FM modulator $s_0(n)$ may be divided into segments of length $N_c$ by segmentation block 850. In segmenting the signal $s_0(n)$, the last segment may be of length less than $N_c$, in which case it may be augmented by zeros to bring its length equal to $N_c$. The $k^{th}$ such segment may be denoted by $V_{c,k}$, i.e., $$V_{c,k} = [s_0(k_1), \ldots, s_0(kN_c)]^T; k_1 = (k-1)N_c + 1; k = 1, 2, \ldots Mc \quad (42)$$

where $M_c$ denotes the number of segments. Also, the sampled version of the character tone signals may be defined as $$V_{c_j,I}^m = [1, \cos(2\pi f_{c_j} T_s), \ldots, \cos(2\pi (N_c-1) f_{c_j} T_s)]^T \quad (43a)$$

$$V_{c_j,Q}^m = [1, \sin(2\pi f_{c_j} T_s), \ldots, \sin(2\pi (N_c-1) f_{c_j} T_s)]^T; j = 1,2,\ldots,7 \quad (43b)$$

where $f_{c_j}$ denotes the $j^{th}$ character tone frequency. The signal segments $V_{c,k}$ may be correlated with the reference signals $V_{c_j,I}^m$ and $V_{c_j,Q}^m$ by correlation blocks 860 to obtain the amplitude estimates of the in-phase and quadrature components of the character tone signals as $$a_{c_j,k}^m = 2 V_{c,k}^T V_{c_j,I}^m / N_c; b_{c_j,k}^m = 2 V_{c,k}^T V_{c_j,Q}^m / N_c; k = 1,\ldots, M_c; j=1,2\ldots 7 \quad (44)$$

The estimates of the amplitude $A_{c_j,k}$ and power $P_{c_j,k}$ in the character tone signal based on the signal segment k are then given by $$A_{c_j,k}^m = \sqrt{[[a_{c_j,k}^m]^2 + [b_{c_j,k}^m]^2]}; \quad (45)$$

$$P_{c_j,k}^m = [A_{c_j,k}^m]^2 / 2;$$

$$j = 1, 2, \ldots, 7$$

using squaring blocks 862, summing blocks 864, and division blocks 866.

The signal $V_{c,k}$ may also be correlated by correlation blocks 852 with the pilot signal segment of length $N_c$ given by $$V_{p,I}^m = [1, \cos(2\pi f_p T_s), \ldots, \cos(2\pi (N_c-1) f_p T_s)]^T \quad (46a)$$

$$V_{p,Q}^m = [1, \sin(2\pi f_p T_s), \ldots, \sin(2\pi (N_c-1) f_p T_s)]^T \quad (46b)$$

with the estimate of the in-phase and quadrature components of the pilot signal based on the $k^{th}$ interval given by $$a_{p,k}^m = 2 V_{c,k}^T V_{p,I}^m / N_c; b_{p,k}^m = 2 V_{c,k}^T V_{p,Q}^m / N_c \quad (47)$$

In principle, the amplitude estimate of the pilot signal obtained earlier can be used, however, in other embodiments, due to the need for keeping the character tone signal estimation independent of the pilot tone estimation, the amplitude estimate of the pilot tone over the $N_c$ samples is performed again. From the in-phase and quadrature component estimates in equation (47), the pilot tone amplitude and power may be estimated by $$A_{p,k}^m = \sqrt{[[a_{p,k}^m]^2 + [b_{p,k}^m]^2]}; \quad (48)$$

$$P_{p,k}^m = [A_{p,k}^m]^2 / 2$$

using squaring blocks 854, summing block 856, and division block 858.

For the purpose of estimating the SNR during the $k^{th}$ segment of the signal $s_0(n)$, the total power $P_{c,k}^m$ present in the character tones during any time segment k may be estimated as the sum of the highest two values $P_{c_j,k}^m$ by operation block 870. The total signal, interference and noise power present in the segment k may be estimated by $$P_{t,k}^m = \frac{1}{N_c} \|V_{c,k}\|^2 \quad (49)$$

determined, as shown in FIG. 8b, by vector inner product block 872 and division block 874. Thus the SNR for the $j^{th}$ character tone may estimated by $$\Gamma_{c_j,k} = P_{c_j,k}^m / [P_{t,k}^m - P_{c,k}^m - P_{p,k}^m] \quad (50)$$

where the quantity $[P_{t,k}^m - P_{c,k}^m - P_{p,k}^m]$ is determined by summation block 876, and divided into the estimated power PC kin each character tone signal by division blocks 878 to produce the SNR for the character tones per equation (50).

A weighted sum of the in-phase and quadrature character tone amplitudes $a_{c_j}$ and $b_{c_j}$ may be obtained as a weighted sum of the amplitude estimates $a_{c_j,k}^m$ and $b_{c_j,k}^m$ computed in equation (44), by $$a_{c_j} = \sum_{k=1}^{M_c} w_{c_j,k} a_{c_j,k}^m; \quad (51)$$

$$b_{c_j} = \sum_{k=1}^{M_c} w_{c_j,k} b_{c_j,k}^m$$

where for the case of the maximal ratio combining the weights $w_{c_j,k}$ are given by $$w_{c_j,k} = \Gamma_{c_j,k} / \sum_{k=1}^{M_c} \Gamma_{c_j,k}; \quad (52)$$

$$k = 1, 2, \ldots, M_c;$$

$$k = 1, 2, \ldots, M_c;$$

$$j = 1, 2, \ldots, 7$$

From $a_{c_j}$ and $b_{c_j}$ in equation (51), the amplitude and power levels of various character tones may be estimated as $$A_{c_j} = \sqrt{[a_{c_j}^2 + b_{c_j}^2]}; \quad (53)$$

$$P_{c_j} = A_{c_j}^2 / 2;$$

$$j = 1, 2, \ldots, 7$$

An estimate of the signal-to-interference plus noise ratio of the final estimate of the character tone signal when maximal ratio combining is used may be given by $$\Gamma_{c_j,mr} = \sum_{k=1}^{M_c} \Gamma_{c_j,k}; \quad (54)$$

$$j = 1, 2, \ldots, 7$$

In the embodiment shown in FIG. 8B, similar to the technique shown in FIG. 8A, the in-phase and quadrature amplitude estimates $a_{c_j,k}^m$ and $b_{c_j,k}^m$, are multiplied respectively by the estimated character tone signal-to-interference plus noise power ratio in segment k, $\Gamma_{c,k}$, by multipliers 880. The outputs of the multipliers 880 are input to accumulators 882, which accumulates the SNR-weighted in-phase and quadrature signal amplitude estimates for $M_c$ samples. Similarly, the estimated character tone signal-to-interference plus noise power ratio in segment k, $\Gamma_{c,k}$, is accumulated over $M_c$ samples by an accumulator 882. The final estimates of the character tone power $P_{c_j}$ are determined dividing the output of the accumulators 882 by the total SNR, Γc, using division blocks 884, to produce $a_{c_j}$ and $b_{c_j}$ for each character tone, as shown in FIG. 8B. The signals $a_{c_j}$ and $b_{c_j}$ for each character tone are squared respectively by squaring blocks 886, with the results being summed by summing blocks 888 and divided by two by division block 890 to produce the final estimate of the total power $P_{c_j}$ for each character tone. The estimates of the power levels of various character tones $P_{c_j}$ along with the estimates of the associated SNR levels $\Gamma_{c_j,mr}$ are then inputted to the command detector, an embodiment of which is illustrated in FIG. 9.

Figure 9:
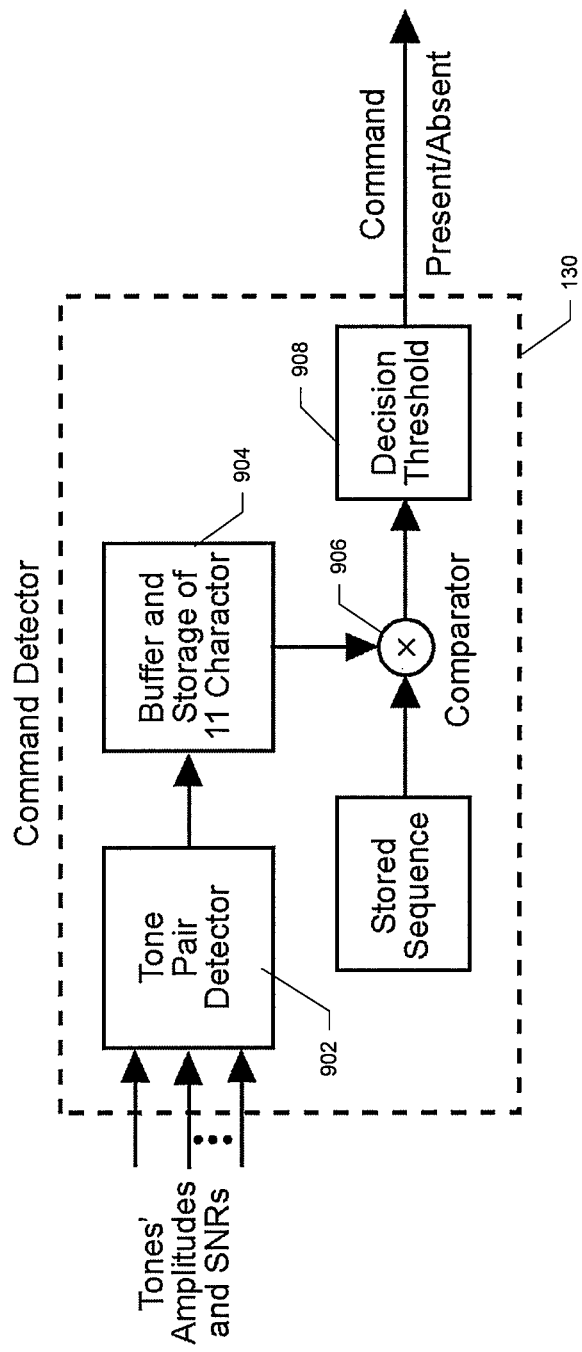
FIG. 9 is a block diagram of a command decoder according to various embodiments of the present invention.

FIG. 9 is a diagram illustrating the command detector 130 according to various embodiments of the present invention. A tone pair detector 902 in the command detector 130 receives the tones' amplitudes and SNRs output from the DSP 120 and determines the pair of character tones that are present to be the ones which have the highest amplitudes, conditioned on both of these highest amplitudes exceeding some threshold selected according to the pilot tone SNR, also available from the digital signal processor DSP 120. The detected character sequence may be stored in a buffer 904 and compared, by a comparator 906, with a stored sequence to determine whether or not the command signal is present as in the traditional command decoder, described above. However, unlike the traditional receiver, the command decoder 130 illustrated in FIG. 9 can also provide a confidence level in the form of the probability of false alarm computed from the tone SNRs available from the digital signal processor block. This information may then be used to determine the number of times the command sequence is to be received (the match occurs) before a final decision is made by the decision threshold 908.

Figure 10:
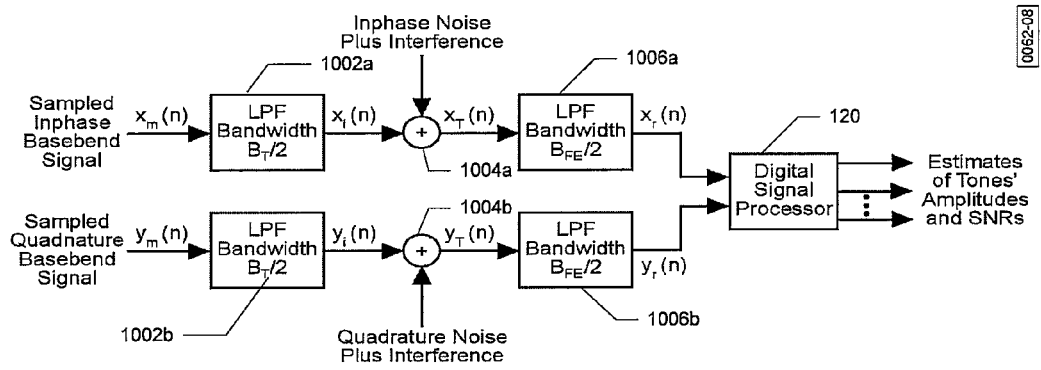
FIG. 10 is a block diagram of a system used to simulate aspects of various embodiments of the present invention.

FIG. 10 shows a block diagram for the complex baseband simulations of the interference mitigation receiver of FIG. 5. As shown in FIG. 5, the in-phase and quadrature baseband signals at the output of the LPFs 116a-b are converted in to digital form by the ADCs 118a-b. These digital signals, denoted by $x_r(n)$ and $y_r(n)$, are the sampled versions of the signals $x_r(t)$ and $y_r(t)$ given by equations (13) and (14) respectively, and are input to the DSP 120 for the estimation of the tones' amplitudes and SNRs as described. The simulator of FIG. 10 obtains the same signals $x_r(n)$ and $y_r(n)$ by an equivalent baseband filtering of the digital signals $x_m(n)$ and $y_m(n)$, which are the sampled versions of the signals $x_m(t)$ and $y_m(t)$ given by equation (55) below.

$$x_m(t) = A_c \cos\left(D_f \int_{-\infty}^{t} m(\tau)d\tau\right); \tag{55}$$

$$y_m(t) = A_c \sin\left(D_f \int_{-\infty}^{t} m(\tau)d\tau\right)$$

The sampled in-phase and quadrature digital signals $x_m(n)$ and $y_m(n)$ are input to the simulator shown in FIG. 10.

The signals $x_m(n)$ and $y_m(n)$ are filtered by a pair of identical low pass digital filters 1002a-b of bandwidth $B_T/2$, representing the baseband equivalent of the composite bandpass transmit filter (comprised of the IF and RF transmit filters) of bandwidth $B_T$, selected equal to 200 kHz in the simulations. The filtered in-phase and quadrature signals are represented by $x_i(n)$ and $y_i(n)$ respectively in FIG. 10. Ignoring the channel attenuation for the purpose of this description, the in-phase and quadrature components of the complex baseband sampled versions of the interference and noise are added to the in-phase and quadrature components $x_i(n)$ and $y_i(n)$ of the received signal by adders 1004a-b. The composite in-phase and quadrature signals, denoted by $x_T(n)$ and $y_T(n)$, are filtered by low pass filters 1006a-b of bandwidth $b_{FE}/2$, representing the baseband equivalent of the composite front end bandpass filter (comprised of the RF and IF filters 102, 106) and the lowpass filters 110a-b of FIG. 5. In the simulations, the bandwidth $B_{FE}$ is selected equal to 1.25 $B_T$. The pair of signals at the outputs of the lowpass filters 1006a-b of bandwidth $B_{FE}/2$, denoted by $x_r(n)$ and $y_r(n)$, are now input to the DSP 120. These signals $x_r(n)$ and $y_r(n)$ are precisely the digitized version of the signals $x_r(t)$ and $y_r(t)$ in equation (16). Furthermore the DSP 120 in the simulator shown in FIG. 10 is identical to that in the actual bandpass FM receiver of FIG. 5.

For the purpose of the simulations, the pulse interference is modeled by a frequency chirped pulse of 5 msec pulse width with its center frequency equal to the FM signal carrier frequency $f_c$. The chirp frequency varies from $f_c$-100 kHz to $f_c$-100 kHz selected so that the spectrum of the pulse spreads over the entire bandwidth of the FM signal. The center of the pulse coincides with the center of the CDS pulse. Such an interference scenario is selected so as to represent the worst case scenario.

In order to fully assess the capabilities of the proposed mitigation technique, it is assumed that the CDS signal is processed only over an interval of a 5 msec period coincident with the extent of the interfering pulse. This scenario is worse than even the one considered above in that there is an interval of 1.66 msec over which there is no interference. However, the successful detection of the FM signal in this condition will demonstrate that the proposed technique is capable of detecting the signal even in scenarios where the interference is not necessarily intermittent. Of course, the simulation results also include the case of a more realistic scenario where the 1.66 msec segment of the CDS signal pulse may be free of interference.

Figure 11:
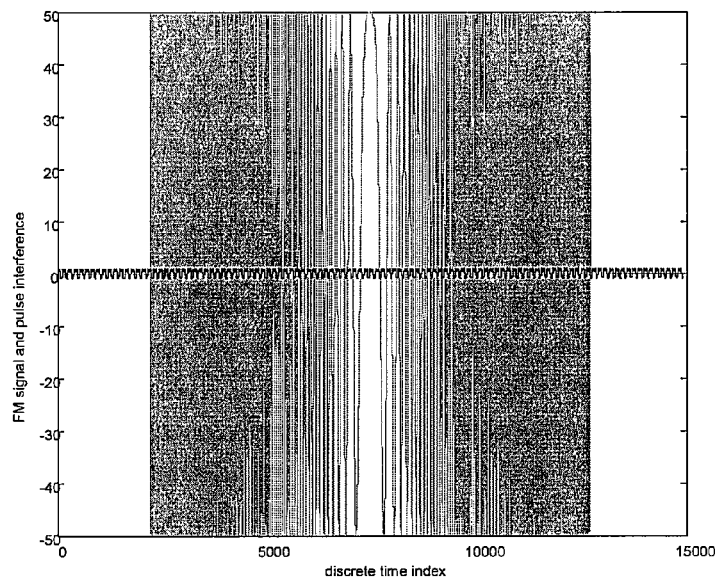
Figure 12:
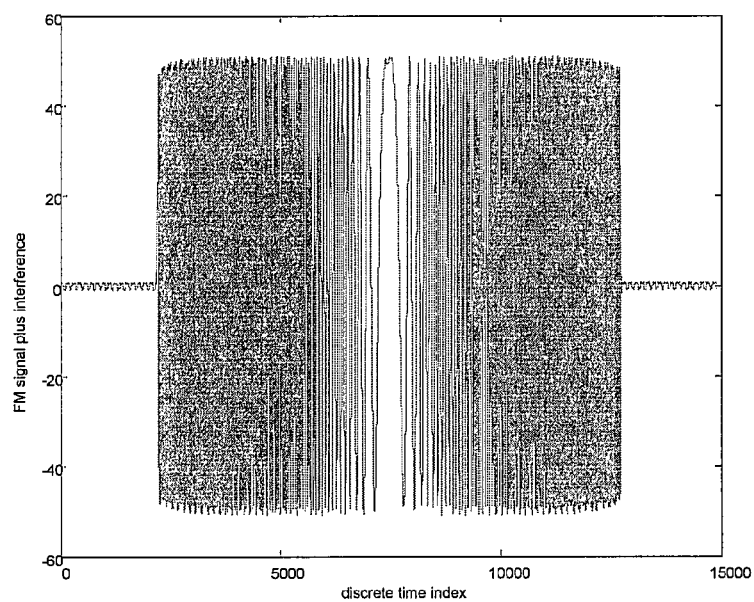

FIG. 11 is a graph showing the real part of the complex envelopes of the FM signal and the interfering pulse at the output of the ADCs 118a-b in FIG. 5. The pulse amplitude is 50 V compared to the FM signal amplitude of 1 V. FIG. 12 is a graph that depicts the sum of these two signals as it appears at the low pass filter outputs. As expected, during the 5 msec pulse period, the sum differs only insignificantly from the interfering pulse alone, i.e., the FM signal is masked by the interference.

Figure 13:
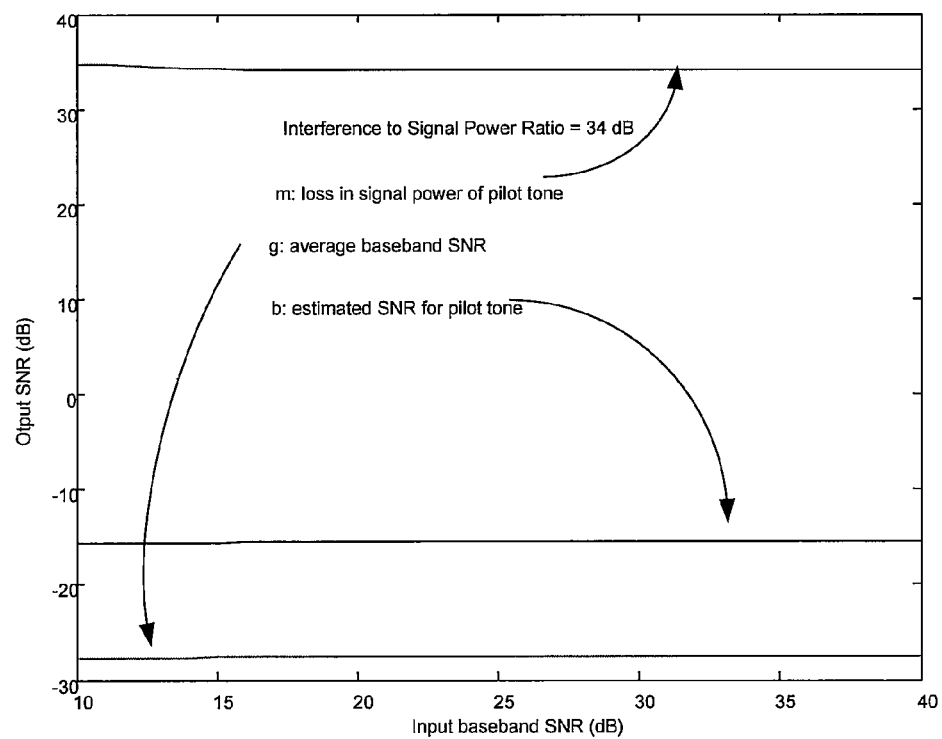

As is perhaps obvious, the standard FM receiver is not expected to provide any meaningful recovery of the desired CDS signal. As a test case, FIG. 13 shows the result when the standard FM receiver (without blanking) is used with the CDS signal containing only the pilot signal at 15.45 MHz and a full 6.67 msec duration signal is processed. As may be inferred from the figure, there is a 30 dB suppression of the pilot tone compared to the case of no interference at the tone detector output. Very low signal-to-noise ratios in the SNR plots of FIG. 13 mean that essentially only noise appears both at the output of the baseband filter and the tone detector. The result shown in FIG. 13 is obtained from 1000 simulation runs. In these simulations, the input baseband SNR is equal to $(A_c^2/(2N_0B_b))$, where $B_b$ denotes the baseband signal bandwidth selected equal to or greater than the pilot tone frequency $f_p$. The output tone SNR in the simulations is the ratio of the tone signal power to the noise plus (residual) interference power ratio at the output of the DSP unit in FIG. 10 but without the interference rejection stage and when the output of the FM demodulator is filtered with the tone bandpass filter 64 and FFT and squaring block 68 of the conventional Command Destruct Subsystem of FIG. 4, instead of the tone amplitude estimation block 128 of the DSP 120. FIG. 11 presents an analytical expression for this ratio under high SNR and interference free conditions. However, the results for the case when interference is present are obtained by simulations.

Figure 14:
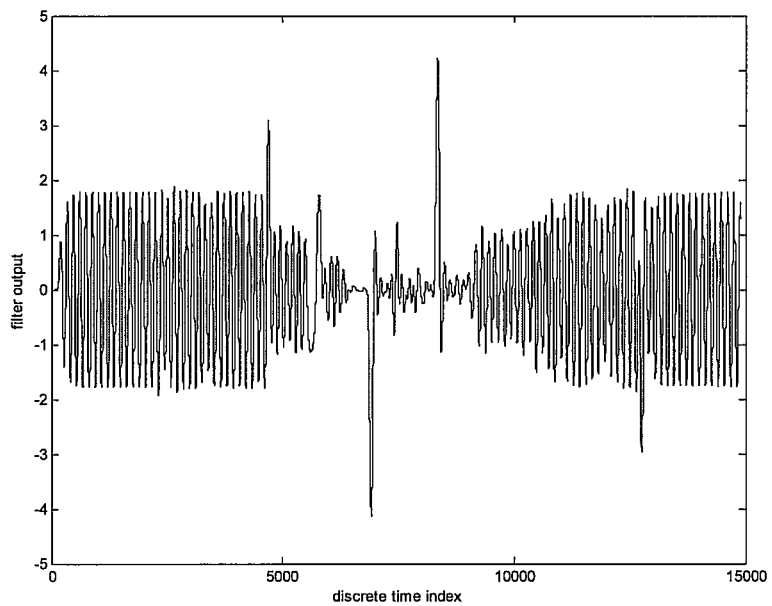
Figure 15:
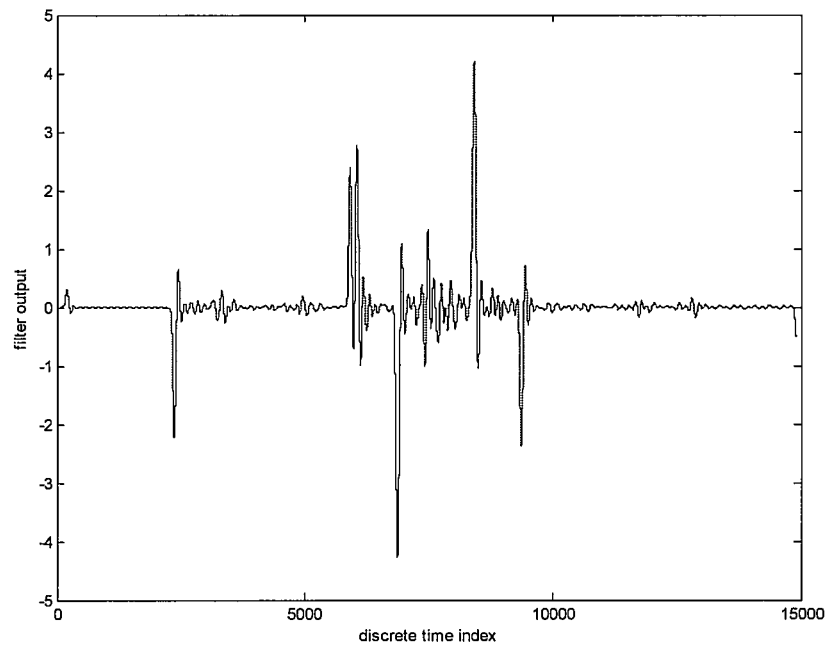

To be able to detect the FM signal, the interference mitigation technique described above may be applied to the FM signal received in the presence of pulse interference. FIG. 14 shows the result when the FM signal contains only the pilot tone at 15.45 kHz frequency and standard digital FM (SFM) demodulation is used for demodulation. The average power of the output signal is equal to 1.16 W. FIG. 15 shows the corresponding result when the FM signal is unmodulated; thus, the output shows the residual interference. The average power of the output is 0.23 W. It may be noted from FIGS. 14-15 that without the interference mitigation, only less than 1800 samples will be interference free on each side of the demodulator output waveform, compared to about 6000 samples with interference mitigation.

FIGS. 16 and 17 plot the corresponding results when a generalized FM (GFM) demodulator, as described above, is used along with the interference mitigation technique. In the presence of the pilot tone, the average signal power at the demodulator output is 1.5 W, compared to 1.16 W for the case of the standard FM demodulation in conjunction with the interference mitigation technique described above. As the difference between the SFM and GFM applies only to the interference free segment, the power ratio between the two cases is much higher if only the power in the segments with (input) interference is considered. For these later segments, the average power between the two cases is 0.80 W and 0.32 W, respectively. Thus, the GFM provides a power gain of about 4 dB over standard FM in further cancellation of the interference. In the absence of the pilot tone, the average power of the demodulator output signal is equal to 0.24 W, which is close to that for the SFM.

As the signal at the demodulator output has non stationary statistics, the application of a standard tone detection circuit leads to relatively poor results as the segments of poor signal-to-interference ratio (SIR) offset the performance of the segments with high SIR. Thus, an optimum maximal ratio combining approach for the tones' amplitude estimation stage 126 described above may be used for the detection of the demodulated signal. FIGS. 18-19 plot the results for such an optimum detector in the presence of receiver noise and the absence of any interference (for the purposes of comparison) for the case of SFM and GFM respectively, where the simulation results are obtained from 1000 simulation runs for each case. In these figures, the average baseband SNR is obtained by first dividing the demodulator output in segments each of length 700 signal samples (the last segment may be of length less than 700 samples), estimating the SNR in each of the segments, and then averaging these estimates. Comparison of the two figures shows that the GFM yields about 1.2 dB higher baseband SNR compared to SFM. However, due to the baseband filtering effects, the GFM has about 1 dB higher loss in SNR (in comparison to the ideal filter case) compared to SFM at the pilot tone frequency of 15.45 kHz. If a much higher order filter is used, this difference in the filter loss will disappear and the GFM will have 2.2 dB higher SNR, as predicted from theory. In these figures, the graphs 181 labeled "Estimated SNR for Pilot Tone" show the estimate of the SNR at the maximal ratio combiner output, and is simply the sum of the SNRs of the individual segments. The graphs 182 in these figures show the pilot tone SNR obtained by the statistical averaging of the 1000 simulation runs. As may be inferred from the figures, the SNR is close to its estimate given by the graphs 181. The graphs 183 in the two figures show the loss in signal power occurs only at relatively low input SNRs. Note that the SFM receiver is expected to provide a SNR improvement of 1.5 $\beta^2$, equal to 7.8 dB, thus achieving a baseband SNR of 47.8 dB with the input SNR in the bandwidth of the post demodulation filter and assuming an ideal filter. This is close to that obtained in FIG. 18, as expected.

FIG. 20 shows the performance of the receiver described above that is comprised of the interference mitigation 122, the GFM demodulator 124, and an optimum tone detector 126 blocks in the presence of the pulse interference shown in FIG. 11, and when only the pilot tone is present in the FM signal. FIG. 20 corresponds to the case when only the 5 msec duration signal, which is interfered with, is processed for the detection. As may be inferred from the figure, the pilot tone can be detected with a signal-to-noise ratio of about 40 dB for the input baseband SNR of 40 dB (corresponding to the input SNR of 32.2 dB), when the interference is 34 dB higher than the FM signal power, and there is no interference free segment available for detection. Thus, the system provides a signal processing gain of 74 dB, which is defined as the ratio of the output SNR to the input SNIR (signal-to-noise plus interference power ratio) in the IF bandwidth. There is also no loss in power of the received pilot tone signal at the input baseband SNR of more than 30 dB. This shows the advantage of such a receiver according to embodiments of the present invention. For lower input baseband SNRs, the output SNR is correspondingly lower as is shown in the figure, which shows that the required output SNR can be achieved with nominal input SNRs, even for 100% overlap between the desired FM signal pulse and the interference pulse.

FIG. 21 plots the performance result when the complete 6.67 msec duration CDS pulse, with 5 msec duration of interference, is processed with a receiver according to an embodiment of the present invention, comprising interference mitigation 122, a GFM demodulator 124, and an optimum tone detection 126 scheme. As may be inferred from the figure, at relatively high input SNRs, the performance in terms of output SNR for the pilot tone is about 10 dB better compared to that in FIG. 20, and is only about 7 dB worse compared to the case of no interference.

FIG. 22 plots the result when both the interference mitigation and GFM are used; however, sub optimum coherent tone detection is used for the case when complete 6.67 msec duration of the CDS signal is processed, which has interference for the 5 msec duration, as is the case with FIG. 21. The graph 221 in FIG. 22 is the same as that in FIG. 21 and shows the estimated performance for the optimum detector. Comparison of the SNR results of FIG. 18 with those of FIG. 17 shows that the performance of the non optimum detector is about 26 dB worse than for the optimum detector at relatively high input SNRs. The difference becomes smaller as the input SNR is reduced. This illustrates the fact that both the interference mitigation and optimum detection are required for optimum performance in terms of the detected tone SNR. FIG. 22 also shows about 2 dB signal power loss even at high SNRs for the sub optimum detector compared to no loss for the case of optimum detector.

FIG. 23 plots the performance results of a receiver according to an embodiment of the present invention when the pilot tone is absent and any signal that is present at the baseband level is due to noise or interference. The SNR for the pilot tone is computed by taking the ratio of the pilot signal power that would be obtained when the pilot tone is actually present and the signal power at the tone detector output in the absence of the pilot tone. Thus, this result is needed to compute the probability of tone false alarm.

As may be inferred from FIG. 23, at input SNR higher than 25 dB, the tone SNR is higher than 20 dB; however, for lower input SNR, the SNR is relatively low. The performance at low SNR can be improved by using a suboptimum detector 126 if the estimated SNR of the optimum detector is below a threshold, as in this case when the estimates of various SNRs required for the optimum detector may not be accurate enough. FIG. 24 shows the results for the modified version. Comparison with FIG. 23 shows that the modification does result in improved performance over lower input SNRs.

FIG. 25 plots the result of a receiver according to an embodiment of the present invention with SNR threshold modification in the presence of both the interference and the pilot tone when the complete 6.67 msec segment of the CDS pulse is processed, and shows that the modification results in some improvement of the tone SNR in this case also. Note that the estimate of the tone SNR shown by the graph 251 is based on the white noise assumption. As the sum of the residual interference and the receiver noise is not white, the actual tone SNR can be significantly different from its estimate as is the case with this figure.

As an interesting case, FIG. 26 shows the performance result when the GFM is used in conjunction with the optimum detector, but the interference mitigation is not used. As is evident from the figure, this configuration results in about 34 dB tone signal power loss compared to the case where interference mitigation is used. Interestingly, the tone SNR is sufficient; however, it is with respect to the 34 dB attenuated signal, and thus has no practical utility. Thus, both the interference rejection and optimum detection are equally important for the requisite tone SNR levels in various embodiments.

When a receiver according to an embodiment of the present invention is used in the absence of interference, the performance is similar to that of the standard FM or GFM, depending upon whether SFM or GFM is used in the system implementation. Thus, it is not essential to switch between two different algorithms based upon the presence or the absence of the interference.

The simulation results thus far involved the case when only the pilot tone was possibly present. Below, simulation results are presented for cases involving both the pilot tone as well as the pair of CDS character tones pair. The optimum detector has been appropriately modified for this case, as described above. FIGS. 27 and 28 plot the results for the case when only the 5 msec duration segment affected by interference is processed. Only the signal power loss and the actual tone SNR are plotted in the figures, as the direct estimate of the SNR is not possible in this case. In the examples considered in the simulations, the character tone frequencies are selected to be 8.4 kHz and 11.55 kHz, respectively. As may be inferred from FIGS. 27 and 28, a character tone SNR of about 28 dB is obtained for an input SNR of 40 dB, with the pilot tone SNR of about 22 dB. Unlike the case of pilot tone, there is some nonzero loss of signal power for the signal character tones.

FIGS. 29-30 plot the results for the case when the complete 6.67 msec CDS signal is processed, with all other parameters the same as for FIGS. 27-28. As may be inferred from these figures, a pilot tone SNR of about 33 dB and character tone SNR of about 58 dB is obtained for a baseband input SNR of 40 dB (input SNR of about 30.3 dB). The reason for relatively lower SNR for the pilot tone is that the pilot tone frequency being known, it is easier to compensate for its power in the character tone detector. In contrast, the character tone frequencies are not known to the pilot tone detector, and thus noise power at other tone frequencies effects its detection. Therefore, the SNR performance for the pilot tone can be improved by making use of the knowledge of the detected character tones. However, this has not been done in the simulations presented to keep pilot detection independent of the character tone detection and the fact that the pilot tone SNR is excellent even as such.

For the purpose of signal detection, it is equally important to ascertain the SNR for the character tones, which are absent as this SNR determines the probability of tone false alarm. FIGS. 31-32 plot the results for 4 absent tones for the case when only the 5 msec segment of the received signal affected by the interference is processed. In these figures, the SNR is computed with respect to the power level of the tone under consideration. Therefore, the SNR with respect to the signal power of the tone present is obtained by adding the signal loss and the SNR graphs of these figures. For example, at 40 dB baseband input SNR, the noise power at the tone detector, corresponding to the 12.6 kHz tone, is 24 dB below the tone signal power that would be present at the tone detector output when this tone was transmitted, obtained by summing the graphs 321 and 322 of FIG. 32.

Figure 34:
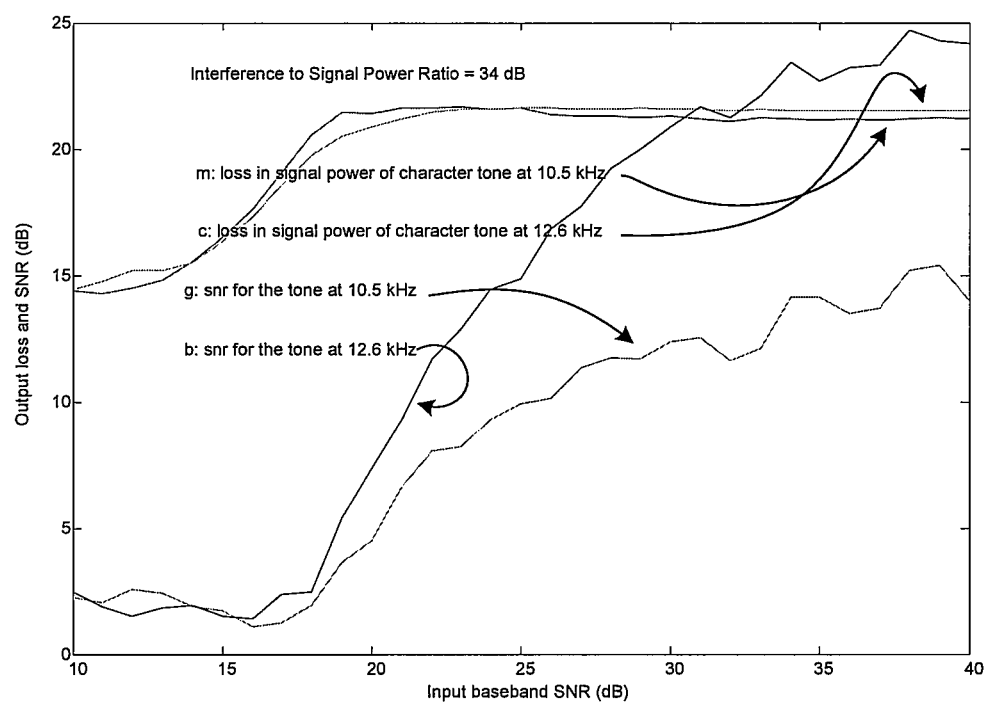

FIGS. 33-34 plot the corresponding results for the case when the complete 6.67 msec signal segment is processed, with all other parameters same as in FIG. 31-32. As may be inferred from these figures, for a baseband input SNR of 40 dB, the effective tone SNR as defined above, of about 35-40 dB is obtained at the outputs of detectors for all tones that are absent. Recall that the effective tone SNR for an absent tone is defined as the ratio of the tone signal power that will be present at the detector output in the presence of the tone to the noise power at the tone detector output in the absence of the tone.

While various embodiments of the invention have been described herein above in the context of the detection of tone signals and FM modulation, the present invention is not so limited and embodiments of the invention can be adapted to other signal types and other modulation schemes. For example, embodiments can be adapted to the detection of one or more spread spectrum codes present in a CDMA signal in the presence of high power interference, where the modulation is BPSK and QPSK modulation. Such CDMA signals, for example, are used in GPS and mobile wireless systems. In addition, in other embodiments of the invention, one or more stages 122-126 in the DSP 120 may not be present.

According to various embodiments, the present invention is directed to a RF receiver that comprises: (i) a complex mixer for converting a version of the RF signal to a complex baseband signal comprising an in-phase component and a quadrature component; (ii) one or more analog-to-digital converters (ADCs) connected to the complex mixer for digitizing the in-phase component and the quadrature component of the complex baseband signal; and (iii) a digital signal processor (DSP) connected the one or more ADCs. The DSP is programmed to mitigate interference in the complex baseband signal by a process that comprises the steps of: (i) performing at least one cross correlation operation involving L-length segments of the digitized in-phase and quadrature components of the complex baseband signal; and (ii) concatenating the cross-correlated L-length segments of the digitized in-phase and quadrature components of the complex baseband signal to produce digitized interference mitigated in-phase and quadrature components of the complex baseband signal.

According to various implementations, two or more iterative cross correlation operations involving the L-length segments of the digitized in-phase and quadrature components of the complex baseband signal are used. Also, the DSP may be programmed to provide a reference signal for mitigating the interference by clipping and filtering the digitized in-phase and quadrature components of the digitized complex baseband signal. In addition, the DSP may be further programmed to demodulate the digitized interference mitigated in-phase and quadrature components of the complex baseband signal to produce a demodulated digital signal (using FM demodulation or some other demodulation). In addition, the DSP may be further programmed to compute an estimate of an amplitude of one or more tones present in the demodulated digitized signal. The DSP may compute the estimate of the amplitude of a first tone present in the demodulated digitized signal by a process that comprises the steps of: (i) segmenting the demodulated digitized signal into a plurality of segments; (ii) cross-correlating the plurality of segments of the demodulated digitized signal with sampled versions of in-phase and quadrature components the first tone to generate amplitude estimates of the in-phase and quadrature components of the first tone for each of the plurality of segments; (iii) weighting each of the plurality of segments of the in-phase and quadrature components of the first tone; and (iv) summing the weighted segments for the in-phase and quadrature components of the first tone. In addition, the DSP may be programmed to estimate the signal-to-interference plus noise ratio for each of the plurality of segments, and the weightings for each of the plurality of segments may be based on the signal-to-interference plus noise ratio for the segment.

According to another embodiment, the present invention is directed to a method that comprises the steps of: (i) receiving, by an antenna of a receiver, a modulated RF signal; (ii) converting, by a complex mixer of the receiver, a version of the modulated RF signal to a complex baseband signal comprising an in-phase component and a quadrature component; (iii) digitizing the in-phase component and the quadrature component of the complex baseband signal with one or more analog-to-digital converters (ADCs) connected to the complex mixer; and (iv) mitigating interference in the digitized complex baseband with a signal a digital signal processor (DSP) connected the one or more ADCs by: (a) performing at least one cross correlation operation involving L-length segments of the digitized in-phase and quadrature components of the complex baseband signal; and (b) concatenating the cross-correlated L-length segments of the digitized in-phase and quadrature components of the complex baseband signal to produce digitized interference mitigated in-phase and quadrature components of the complex baseband signal.

According to various implementations, mitigating the interference may further comprise clipping and filtering the digitized in-phase and quadrature components of the complex baseband signal. In addition, the method may further comprise digitally demodulating, by the DSP, the digitized interference mitigated in-phase and quadrature components of the complex baseband signal to produce a demodulated digital signal. In addition, the method may further comprise computing, by the DSP, an estimate of an amplitude of one or more tones present in the demodulated digitized signal. The step of computing the estimate of the amplitude of the one or more tones present in the demodulated digitized signal may comprise computing the estimate of the amplitude of a first tone present in the demodulated digitized signal by a process that comprises the steps of: (i) segmenting the demodulated digitized signal into a plurality of segments; (ii) cross-correlating the plurality of segments of the demodulated digitized signal with sampled versions of the in-phase and quadrature components of the first tone to generate amplitude estimates of the in-phase and quadrature components of the first tone for each of the plurality of segments; (iii) weighting each of the plurality of segments of the in-phase and quadrature components of the first tone; and (iv) summing the weighted segments for the in-phase and quadrature components of the first tone.

In addition, the method may comprise estimating, by the DSP, the signal-to-interference plus noise ratio for each of the plurality of segments. Also, the step of weighting each of the plurality of segments of the in-phase and quadrature components of the first tone may comprise weighting each of the plurality of segments of the in-phase and quadrature components of the first tone with a weight based on the signal-to-interference plus noise ratio for the segment.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein may be implemented in many different embodiments of software, firmware, and/or hardware. The software and firmware code may be executed by a computer or computing device comprising a processor (e.g., a DSP or any other similar processing circuit). The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated with a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A RF receiver comprising:
    a complex mixer for converting a version of an input RF signal to an input complex baseband signal comprising an input in-phase component and an input quadrature component;
    one or more analog-to-digital converters (ADCs) connected to the complex mixer for digitizing the input in-phase component and the input quadrature component of the input complex baseband signal; and
    a digital signal processor (DSP) connected the one or more ADCs, wherein the DSP is programmed to mitigate interference in the input complex baseband signal by:
        performing at least one cross correlation operation involving L-length segments of the digitized input in-phase and input quadrature components of the input complex baseband signal; and
        concatenating the cross-correlated L-length segments of the digitized input in-phase and input quadrature components of the input complex baseband signal to produce digitized interference mitigated in-phase and quadrature components of the input complex baseband signal.

2. The receiver of claim 1, wherein the at least one cross correlation operation comprises two or more iterative cross correlation operations involving the L-length segments of the digitized input in-phase and input quadrature components of the input complex baseband signal.

3. The receiver of claim 1, wherein the DSP is programmed to construct a reference signal for mitigating the interference by clipping and filtering the digitized input in-phase and input quadrature components of the digitized complex baseband signal.

4. The receiver of claim 2, wherein the DSP is programmed to mitigate interference in the digitized complex baseband signal by independently clipping the digitized input in-phase and input quadrature components of the input complex baseband signal prior to performing two or more iterative cross correlation operations.

5. The receiver of claim 1, wherein the DSP is further programmed to demodulate the digitized interference mitigated in-phase and quadrature components of the input complex baseband signal to produce a demodulated digital signal.

6. The receiver of claim 4, wherein the DSP is further programmed to demodulate the digitized interference mitigated in-phase and quadrature components of the input complex baseband signal to produce a demodulated digital signal.

7. The receiver of claim 6, wherein the DSP is programmed to demodulate the digitized interference mitigated in-phase and quadrature components of the input complex baseband signal using a digital FM demodulation scheme.

8. The receiver of claim 5, wherein the DSP is further programmed to compute an estimate of an amplitude of one or more tones present in the demodulated digitized signal.

9. The receiver of claim 7, wherein the DSP is further programmed to compute an estimate of an amplitude of one or more tones present in the demodulated digitized signal.

10. The receiver of claim 1, wherein the DSP is further programmed to compute an estimate of an amplitude of one or more tones present in the input complex baseband signal.

11. The receiver of claim 8, wherein the DSP is programmed to compute the estimate of the amplitude of a first tone present in the demodulated digitized signal by a process that comprises the steps of:
    segmenting the demodulated digitized signal into a plurality of segments;
    cross-correlating the plurality of segments of the demodulated digitized signal with sampled versions of in-phase and quadrature components the first tone to generate amplitude estimates of the in-phase and quadrature components of the first tone for each of the plurality of segments;
    weighting each of the plurality of segments of the in-phase and quadrature components of the first tone; and
    summing the weighted segments for the in-phase and quadrature components of the first tone.

12. The receiver of claim 11, wherein:
    the DSP further is programmed to estimate the signal-to-interference plus noise ratio for each of the plurality of segments; and
    weighting each of the plurality of segments of the in-phase and quadrature components of the first tone comprises weighting each of the plurality of segments of the in-phase and quadrature components of the first tone with a weight based on the signal-to-interference plus noise ratio for the segment.

13. The receiver of claim 9, wherein the DSP is programmed to compute the estimate of the amplitude of a first tone present in the demodulated digitized signal by a process that comprises the steps of:
    segmenting the demodulated digitized signal into a plurality of segments;
    cross-correlating the plurality of segments of the demodulated digitized signal with sampled versions of in-phase and quadrature components the first tone to generate amplitude estimates of the in-phase and quadrature components of the first tone for each of the plurality of segments;
    weighting each of the plurality of segments of the in-phase and quadrature components of the first tone; and
    summing the weighted segments for the in-phase and quadrature components of the first tone.

14. The receiver of claim 13,
    further comprising estimating the signal-to-interference plus noise ratio for each of the plurality of segments; and
    wherein weighting each of the plurality of segments of the in-phase and quadrature components of the first tone comprises weighting each of the plurality of segments of the in-phase and quadrature components of the first tone with a weight based on the signal-to-interference plus noise ratio for the segment.

15. A method comprising:
    receiving, by an antenna of a receiver, an input modulated RF signal;
    converting, by a complex mixer of the receiver, a version of the input modulated RF signal to an input complex baseband signal comprising an input in-phase component and an input quadrature component;
    digitizing the input in-phase component and the input quadrature component of the input complex baseband signal with one or more analog-to-digital converters (ADCs) connected to the complex mixer; and
    mitigating interference in the digitized complex baseband with a signal a digital signal processor (DSP) connected the one or more ADCs by:
        performing at least one cross correlation operation involving L-length segments of the digitized input in-phase and input quadrature components of the input complex baseband signal; and
        concatenating the cross-correlated L-length segments of the digitized input in-phase and input quadrature components of the input complex baseband signal to produce digitized interference mitigated in-phase and quadrature components of the input complex baseband signal.

16. The method of claim 15, wherein mitigating the interference further comprises clipping and filtering the digitized input in-phase and input quadrature components of the input complex baseband signal.

17. The method of claim 15, further comprising digitally demodulating, by the DSP, the digitized interference mitigated in-phase and quadrature components of the input complex baseband signal to produce a demodulated digital signal.

18. The method of claim 17, further comprising computing, by the DSP, an estimate of an amplitude of one or more tones present in the demodulated digitized signal.

19. The method of claim 18, wherein computing the estimate of the amplitude of one or more tones present in the demodulated digitized signal comprises computing the estimate of the amplitude of a first tone present in the demodulated digitized signal by a process that comprises the steps of:
  segmenting the demodulated digitized signal into a plurality of segments;
  cross-correlating the plurality of segments of the demodulated digitized signal with sampled versions of in-phase and quadrature components the first tone to generate amplitude estimates of the in-phase and quadrature components of the first tone for each of the plurality of segments;
  weighting each of the plurality of segments of the in-phase and quadrature components of the first tone; and
  summing the weighted segments for the in-phase and quadrature components of the first tone.

20. The method of claim 19, further comprising estimating, by the DSP, the signal-to-interference plus noise ratio for each of the plurality of segments; and
  wherein weighting each of the plurality of segments of the in-phase and quadrature components of the first tone comprises weighting each of the plurality of segments of the in-phase and quadrature components of the first tone with a weight based on the signal-to-interference plus noise ratio for the segment.

21. The system of claim 3 wherein the reference signal is a scaled version of estimates of the input inphase and input quadrature components of the interference present in the input complex baseband signal.

* * * * *